(12) United States Patent
Hara et al.

(10) Patent No.: US 8,125,858 B2
(45) Date of Patent: Feb. 28, 2012

(54) HEAT-ASSISTED MAGNETIC RECORDING HEAD INCLUDING PLASMON GENERATOR

(75) Inventors: Shinji Hara, Tokyo (JP); Tsutomu Chou, Tokyo (JP); Kosuke Tanaka, Tokyo (JP); Eiji Komura, Thomas (JP); Koji Shimazawa, Tokyo (JP); Daisuke Miyauchi, Tokyo (JP); Susumu Aoki, Tokyo (JP); Takeshi Tsutsumi, Tokyo (JP)

(73) Assignee: TDK Corporation, Tokyo (JP)

( * ) Notice: Subject to any disclaimer, the term of this patent is extended or adjusted under 35 U.S.C. 154(b) by 116 days.

(21) Appl. No.: 12/728,890

(22) Filed: Mar. 22, 2010

(65) Prior Publication Data

US 2011/0228420 A1 Sep. 22, 2011

(51) Int. Cl.
*G11B 11/00* (2006.01)
(52) U.S. Cl. .................. 369/13.33; 369/112.27
(58) Field of Classification Search ............... 369/13.02, 369/13.03, 13.32, 112.27, 13.24, 13.33, 13.13, 369/13.12; 385/31, 129; 360/59, 245.3
See application file for complete search history.

(56) References Cited

U.S. PATENT DOCUMENTS

| | | | |
|---|---|---|---|
| 7,221,826 B2 | 5/2007 | Hanashima et al. | |
| 7,454,095 B2 | 11/2008 | Baehr-Jones et al. | |
| 7,529,158 B2 | 5/2009 | Matsumoto et al. | |
| 7,821,732 B2 * | 10/2010 | Komura et al. | 360/59 |
| 7,911,882 B2 * | 3/2011 | Shimazawa et al. | 369/13.33 |
| 8,000,178 B2 * | 8/2011 | Shimazawa et al. | 369/13.33 |
| 2007/0139818 A1 | 6/2007 | Shimazawa et al. | |
| 2009/0168220 A1 | 7/2009 | Komura et al. | |
| 2011/0205860 A1 * | 8/2011 | Chou et al. | 369/13.24 |
| 2011/0216634 A1 | 9/2011 | Chou et al. | |
| 2011/0228419 A1 | 9/2011 | Tanaka et al. | |

FOREIGN PATENT DOCUMENTS

JP    A-2004-302241    10/2004

OTHER PUBLICATIONS

Sep. 21, 2011 Notice of Allowance issued in U.S. Appl. No. 12/710,129.
Sep. 21, 2011 Office Action issued in U.S. Appl. No. 12/728,600.
Sep. 19, 2011 Office Action issued in U.S. Appl. No. 12/719,496.
U.S. Appl. No. 12/617,853, filed Nov. 13, 2009 to Komura et al.
U.S. Appl. No. 12/385,447, filed Apr. 8, 2009 to Sasaki et al.
U.S. Appl. No. 12/557,078, filed Sep. 10, 2009 to Miyauchi et al.
U.S. Appl. No. 12/585,150, filed Sep. 4, 2009 to Sasaki et al.

\* cited by examiner

*Primary Examiner* — Ali Neyzari
(74) *Attorney, Agent, or Firm* — Oliff & Berridge, PLC

(57) ABSTRACT

A plasmon generator has an outer surface including a plasmon exciting part, and has a near-field light generating part located in a medium facing surface. The plasmon exciting part faces an evanescent light generating surface of a waveguide's core with a predetermined distance therebetween. The outer surface of the plasmon generator further includes first and second inclined surfaces that are each connected to the plasmon exciting part. The first and second inclined surfaces increase in distance from each other with increasing distance from the plasmon exciting part. The plasmon generator includes a shape changing portion where the angle of inclination of each of the first and second inclined surfaces with respect to the evanescent light generating surface increases continuously with decreasing distance to the medium facing surface.

16 Claims, 25 Drawing Sheets

| $\theta_A$ | $\theta_B$ | | | | | | | | | | | | | | | | |
|---|---|---|---|---|---|---|---|---|---|---|---|---|---|---|---|---|---|
| | 85 | 80 | 75 | 70 | 65 | 60 | 55 | 50 | 45 | 40 | 35 | 30 | 25 | 20 | 15 | 10 | 5 |
| 85deg | 100 | 130 | 250 | 170 | 130 | 100 | 90 | 80 | 70 | 70 | 60 | 50 | 40 | 30 | 10 | 10 | 0 |
| 80deg | 50 | 100 | 130 | 220 | 200 | 170 | 160 | 150 | 140 | 130 | 120 | 110 | 100 | 70 | 20 | 10 | 10 |
| 75deg | 30 | 60 | 100 | 140 | 180 | 210 | 200 | 180 | 170 | 160 | 150 | 140 | 130 | 110 | 60 | 20 | 10 |
| 70deg | 10 | 30 | 70 | 100 | 120 | 140 | 170 | 180 | 170 | 160 | 140 | 140 | 130 | 120 | 70 | 30 | 10 |
| 65deg | 0 | 10 | 40 | 80 | 100 | 120 | 150 | 160 | 170 | 160 | 150 | 140 | 130 | 120 | 80 | 30 | 10 |
| 60deg | 0 | 10 | 30 | 70 | 90 | 100 | 110 | 120 | 140 | 150 | 140 | 130 | 130 | 120 | 80 | 40 | 10 |
| 55deg | 0 | 10 | 20 | 50 | 70 | 90 | 100 | 110 | 120 | 120 | 130 | 130 | 140 | 130 | 90 | 40 | 10 |
| 50deg | 0 | 0 | 20 | 40 | 50 | 80 | 90 | 100 | 100 | 110 | 120 | 120 | 130 | 120 | 80 | 40 | 10 |
| 45deg | 0 | 0 | 20 | 30 | 50 | 70 | 90 | 100 | 100 | 100 | 110 | 110 | 120 | 110 | 80 | 40 | 10 |
| 40deg | 0 | 0 | 10 | 30 | 40 | 60 | 80 | 90 | 100 | 100 | 100 | 110 | 110 | 110 | 70 | 40 | 10 |
| 35deg | 0 | 0 | 10 | 20 | 40 | 60 | 70 | 80 | 90 | 90 | 100 | 100 | 100 | 110 | 70 | 30 | 10 |
| 30deg | 0 | 0 | 10 | 20 | 30 | 50 | 70 | 80 | 80 | 90 | 90 | 100 | 100 | 90 | 70 | 30 | 10 |
| 25deg | 0 | 0 | 10 | 20 | 30 | 50 | 60 | 70 | 70 | 80 | 90 | 90 | 100 | 90 | 60 | 30 | 10 |

FIG. 22

| $\theta_A$ | $\theta_B$ | | | | | | | | | | | | | | | | |
|---|---|---|---|---|---|---|---|---|---|---|---|---|---|---|---|---|---|
| | 85 | 80 | 75 | 70 | 65 | 60 | 55 | 50 | 45 | 40 | 35 | 30 | 25 | 20 | 15 | 10 | 5 |
| 85deg | 100 | 120 | 200 | 150 | 120 | 100 | 90 | 90 | 80 | 80 | 70 | 70 | 60 | 50 | 40 | 40 | 30 |
| 80deg | 70 | 100 | 120 | 180 | 170 | 150 | 140 | 130 | 130 | 120 | 120 | 110 | 100 | 80 | 50 | 40 | 40 |
| 75deg | 50 | 70 | 100 | 130 | 150 | 170 | 160 | 150 | 150 | 140 | 130 | 120 | 120 | 110 | 70 | 50 | 40 |
| 70deg | 40 | 50 | 80 | 100 | 120 | 140 | 150 | 150 | 140 | 140 | 130 | 130 | 120 | 110 | 80 | 50 | 40 |
| 65deg | 30 | 40 | 60 | 90 | 100 | 110 | 120 | 130 | 140 | 140 | 130 | 130 | 120 | 120 | 90 | 50 | 40 |
| 60deg | 30 | 40 | 50 | 80 | 90 | 100 | 110 | 120 | 120 | 130 | 130 | 120 | 120 | 120 | 90 | 60 | 40 |
| 55deg | 30 | 40 | 50 | 70 | 80 | 90 | 100 | 110 | 110 | 120 | 120 | 120 | 130 | 120 | 90 | 60 | 40 |
| 50deg | 30 | 30 | 50 | 60 | 70 | 90 | 90 | 100 | 100 | 110 | 110 | 120 | 120 | 110 | 90 | 60 | 40 |
| 45deg | 30 | 30 | 50 | 50 | 70 | 80 | 90 | 100 | 100 | 100 | 110 | 110 | 120 | 110 | 90 | 60 | 40 |
| 40deg | 30 | 30 | 40 | 50 | 60 | 70 | 90 | 90 | 100 | 100 | 100 | 110 | 110 | 110 | 80 | 60 | 40 |
| 35deg | 30 | 30 | 40 | 50 | 60 | 70 | 80 | 90 | 90 | 90 | 100 | 100 | 100 | 110 | 80 | 50 | 40 |
| 30deg | 30 | 30 | 40 | 50 | 50 | 70 | 80 | 90 | 90 | 90 | 90 | 100 | 100 | 90 | 80 | 50 | 40 |
| 25deg | 30 | 30 | 40 | 50 | 50 | 70 | 70 | 80 | 80 | 90 | 90 | 90 | 100 | 90 | 70 | 50 | 40 |

FIG. 23

| $\theta_A$ | $\theta_B$ | | | | | | | | | | | | | | | | |
|---|---|---|---|---|---|---|---|---|---|---|---|---|---|---|---|---|---|
| | 85 | 80 | 75 | 70 | 65 | 60 | 55 | 50 | 45 | 40 | 35 | 30 | 25 | 20 | 15 | 10 | 5 |
| 85deg | 1.00 | 0.50 | 0.34 | 0.25 | 0.21 | 0.17 | 0.15 | 0.14 | 0.12 | 0.11 | 0.11 | 0.10 | 0.10 | 0.09 | 0.09 | 0.09 | 0.09 |
| 80deg | 1.99 | 1.00 | 0.67 | 0.51 | 0.41 | 0.35 | 0.30 | 0.27 | 0.25 | 0.23 | 0.21 | 0.20 | 0.19 | 0.18 | 0.18 | 0.18 | 0.17 |
| 75deg | 2.97 | 1.49 | 1.00 | 0.76 | 0.61 | 0.52 | 0.45 | 0.40 | 0.37 | 0.34 | 0.32 | 0.30 | 0.29 | 0.28 | 0.27 | 0.26 | 0.26 |
| 70deg | 3.92 | 1.97 | 1.32 | 1.00 | 0.81 | 0.68 | 0.60 | 0.53 | 0.48 | 0.45 | 0.42 | 0.39 | 0.38 | 0.36 | 0.35 | 0.35 | 0.34 |
| 65deg | 4.85 | 2.43 | 1.63 | 1.24 | 1.00 | 0.85 | 0.74 | 0.66 | 0.60 | 0.55 | 0.52 | 0.49 | 0.47 | 0.45 | 0.44 | 0.43 | 0.42 |
| 60deg | 5.74 | 2.88 | 1.93 | 1.46 | 1.18 | 1.00 | 0.87 | 0.78 | 0.71 | 0.65 | 0.61 | 0.58 | 0.55 | 0.53 | 0.52 | 0.51 | 0.50 |
| 55deg | 6.58 | 3.30 | 2.22 | 1.68 | 1.36 | 1.15 | 1.00 | 0.89 | 0.81 | 0.75 | 0.70 | 0.66 | 0.63 | 0.61 | 0.59 | 0.58 | 0.58 |
| 50deg | 7.38 | 3.70 | 2.48 | 1.88 | 1.52 | 1.29 | 1.12 | 1.00 | 0.91 | 0.84 | 0.78 | 0.74 | 0.71 | 0.68 | 0.67 | 0.65 | 0.65 |
| 45deg | 8.11 | 4.07 | 2.73 | 2.07 | 1.67 | 1.41 | 1.23 | 1.10 | 1.00 | 0.92 | 0.86 | 0.82 | 0.78 | 0.75 | 0.73 | 0.72 | 0.71 |
| 40deg | 8.79 | 4.41 | 2.96 | 2.24 | 1.81 | 1.53 | 1.34 | 1.19 | 1.08 | 1.00 | 0.94 | 0.88 | 0.85 | 0.82 | 0.79 | 0.78 | 0.77 |
| 35deg | 9.40 | 4.72 | 3.16 | 2.40 | 1.94 | 1.64 | 1.43 | 1.27 | 1.16 | 1.07 | 1.00 | 0.95 | 0.90 | 0.87 | 0.85 | 0.83 | 0.82 |
| 30deg | 9.94 | 4.99 | 3.35 | 2.53 | 2.05 | 1.73 | 1.51 | 1.35 | 1.22 | 1.13 | 1.06 | 1.00 | 0.96 | 0.92 | 0.90 | 0.88 | 0.87 |
| 25deg | #### | 5.22 | 3.50 | 2.65 | 2.14 | 1.81 | 1.58 | 1.41 | 1.28 | 1.18 | 1.11 | 1.05 | 1.00 | 0.96 | 0.94 | 0.92 | 0.91 |

FIG. 24

HEAT-ASSISTED MAGNETIC RECORDING HEAD INCLUDING PLASMON GENERATOR

BACKGROUND OF THE INVENTION

1. Field of the Invention

The present invention relates to a heat-assisted magnetic recording head including a plasmon generator for use in heat-assisted magnetic recording where a magnetic recording medium is irradiated with near-field light to lower the coercivity of the magnetic recording medium for data writing.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) intended for reading and a write head including an induction-type electromagnetic transducer intended for writing are stacked on a substrate. In a magnetic disk drive, the thin-film magnetic head is mounted on a slider that flies slightly above the surface of the magnetic recording medium.

Magnetic recording media are discrete media each made of an aggregate of magnetic fine particles, each magnetic fine particle forming a single-domain structure. A single recording bit of a magnetic recording medium is composed of a plurality of magnetic fine particles. For improved recording density, it is necessary to reduce asperities at the borders between adjoining recording bits. To achieve this, the magnetic fine particles must be made smaller. However, making the magnetic fine particles smaller causes the problem that the thermal stability of magnetization of the magnetic fine particles decreases with decreasing volume of the magnetic fine particles. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the foregoing problems, there has been proposed a technique so-called heat-assisted magnetic recording. This technique uses a magnetic recording medium having high coercivity. When writing data, a magnetic field and heat are simultaneously applied to the area of the magnetic recording medium where to write data, so that the area rises in temperature and drops in coercivity for data writing. Hereinafter, a magnetic head for use in heat-assisted magnetic recording will be referred to as a heat-assisted magnetic recording head.

In heat-assisted magnetic recording, near-field light is typically used as a means for applying heat to the magnetic recording medium. A commonly known method for generating near-field light is to use a near-field optical probe or so-called plasmon antenna, which is a piece of metal that generates near-field light from plasmons excited by irradiation with light.

However, the plasmon antenna which generates near-field light by direct irradiation with light is known to exhibit very low efficiency of transformation of the applied light into near-field light. The energy of the light applied to the plasmon antenna is mostly reflected off the surface of the plasmon antenna, or transformed into thermal energy and absorbed by the plasmon antenna. The plasmon antenna is small in volume since the size of the plasmon antenna is set to be smaller than or equal to the wavelength of the light. The plasmon antenna therefore shows a significant increase in temperature when it absorbs the thermal energy.

Such a temperature increase makes the plasmon antenna expand in volume and protrude from a medium facing surface, which is the surface of the heat-assisted magnetic recording head to face the magnetic recording medium. This causes an end of the read head located in the medium facing surface to get farther from the magnetic recording medium, thereby causing the problem that a servo signal cannot be read during write operations.

There has been known a technique in which a dielectric and a metal are arranged to face each other with a predetermined gap therebetween, and surface plasmons are excited on the metal by utilizing evanescent light that results from the total reflection of the light propagated through the dielectric at the surface of the dielectric. As a related technique, U.S. Pat. No. 7,454,095 discloses a technique in which a metal waveguide and a dielectric wave guide are arranged to face each other with a predetermined gap therebetween, and the metal waveguide is coupled with the dielectric waveguide in a surface plasmon mode. It is then conceivable to establish coupling between the light propagated through the waveguide's core and a plasmon generator, a piece of metal, in a surface plasmon mode through a buffer part so that surface plasmons are excited on the plasmon generator, instead of directly irradiating the plasmon generator with the light. According to such a technique, it is possible to transform the light propagated through the core into near-field light with high efficiency. Since the plasmon generator is not directly irradiated with the light propagated through the core, it is also possible to prevent the plasmon generator from excessively increasing in temperature.

The plasmon generator may be shaped to have an edge part that faces the outer surface of the core with a predetermined distance therebetween. An example of such a shape is a triangular-prism shape. Such a plasmon generator has a front end face that is located in the medium facing surface. The front end face includes a tip that lies at an end of the edge part to form a near-field light generating part. The plasmon generator includes two inclined surfaces that are each connected to the edge part, the two inclined surfaces increasing in distance from each other with increasing distance from the edge part. In the plasmon generator, surface plasmons are excited on the edge part through coupling with the evanescent light that occurs from the outer surface of the core. The surface plasmons are propagated along the edge part to the near-field light generating part located in the medium facing surface, and the near-field light generating part generates near-field light based on the surface plasmons. With such a plasmon generator, it is possible to propagate the surface plasmons excited on the edge part to the near-field light generating part with high efficiency.

In order to increase the recording density of a magnetic recording device, it is preferred that the near-field light have a smaller spot diameter. For that purpose, it is preferred that the front end face of the plasmon generator have a sharply pointed tip. The front end face of such a shape can be formed by increasing the angle of inclination of each of the two inclined surfaces with respect to the outer surface of the core. Increasing the angle of inclination, however, causes the problem of reducing surface plasmons to be excited on the edge part, thereby causing a drop in the use efficiency of the light that is propagated through the core.

OBJECT AND SUMMARY OF THE INVENTION

It is an object of the present invention to provide a heat-assisted magnetic recording head that allows efficient use of light propagated through a waveguide's core and allows generation of near-field light having a small spot diameter from a plasmon generator, and to provide a head gimbal assembly and a magnetic recording device that each include such a heat-assisted magnetic recording head.

A heat-assisted magnetic recording head of the present invention includes: a medium facing surface that faces a magnetic recording medium; a magnetic pole that has an end face located in the medium facing surface and produces a write magnetic field for writing data on the magnetic recording medium; a waveguide including a core and a clad, the core propagating light; and a plasmon generator.

The core has an evanescent light generating surface that generates evanescent light based on the light propagated through the core. The plasmon generator has an outer surface including a plasmon exciting part, and has a near-field light generating part located in the medium facing surface. The plasmon exciting part faces the evanescent light generating surface with a predetermined distance therebetween. A surface plasmon is excited on the plasmon exciting part through coupling with the evanescent light generated from the evanescent light generating surface. The near-field light generating part generates near-field light based on the surface plasmon excited on the plasmon exciting part. The outer surface of the plasmon generator further includes first and second inclined surfaces that are each connected to the plasmon exciting part. The first and second inclined surfaces increase in distance from each other with increasing distance from the plasmon exciting part. The plasmon generator includes a shape changing portion where the angle of inclination of each of the first and second inclined surfaces with respect to the evanescent light generating surface increases continuously with decreasing distance to the medium facing surface.

In the heat-assisted magnetic recording head of the present invention, each of the first and second inclined surfaces may have an end located in the medium facing surface. The angle of inclination may peak at the medium facing surface. In such a case, the shape changing portion may have an end located in the medium facing surface. Alternatively, the shape changing portion may have an end that is closer to the medium facing surface, the end being located at a distance from the medium facing surface. Then, the plasmon generator may further include a portion located between the end of the shape changing portion and the medium facing surface. The angle of inclination in this portion may be equal to that at the end of the shape changing portion.

In the heat-assisted magnetic recording head of the present invention, the plasmon exciting part may include a propagation edge that is formed by the first and second inclined surfaces meeting each other. In such a case, the near-field light generating part may lie at an end of the propagation edge, and at least a part of the propagation edge may lie in the shape changing portion.

In the heat-assisted magnetic recording head of the present invention, the plasmon exciting part may include a flat surface part that connects respective ends of the first and second inclined surfaces to each other, the respective ends being closer to the evanescent light generating surface. In such a case, the flat surface part may include a width changing portion. The width changing portion has a width that decreases with decreasing distance to the medium facing surface, the width being in a direction parallel to the medium facing surface and the evanescent light generating surface. At least a part of the width changing portion may lie in the shape changing portion. The width changing portion may have a front end part that is closer to the medium facing surface. The front end part may be located at a distance from the medium facing surface. The plasmon exciting part may further have a propagation edge that connects the front end part of the width changing portion to the near-field light generating part. At least a part of the propagation edge may lie in the shape changing portion.

In the heat-assisted magnetic recording head of the present invention, the outer surface of the plasmon generator may further include a front end face located in the medium facing surface. The front end face may include a tip that forms the near-field light generating part. In such a case, the front end face of the outer surface of the plasmon generator may have two portions that are connected to each other into a V-shape, and the end face of the magnetic pole may have a triangular portion that lies between the two portions of the front end face.

In the heat-assisted magnetic recording head of the present invention, the plasmon generator may have a V-shaped portion that includes the shape changing portion. The V-shaped portion is V-shaped in cross section parallel to the medium facing surface. The first and second inclined surfaces include surfaces of the V-shaped portion that lie on opposite sides in the direction parallel to the medium facing surface and the evanescent light generating surface. The plasmon exciting part includes a propagation edge that is formed by the first and second inclined surfaces meeting each other. The magnetic pole may include a portion accommodated in the V-shaped portion.

In the heat-assisted magnetic recording head of the present invention, the plasmon generator may have a bottom part that is shaped like a plate and faces the evanescent light generating surface, and two sidewall parts that are each shaped like a plate. The two sidewall parts are located farther from the evanescent light generating surface than is the bottom part and are connected to opposite ends of the bottom part in the direction parallel to the medium facing surface and the evanescent light generating surface. The bottom part has a width that decreases with decreasing distance to the medium facing surface, the width being in the direction parallel to the medium facing surface and the evanescent light generating surface. The distance between the two sidewall parts in the direction parallel to the medium facing surface and the evanescent light generating surface increases with increasing distance from the evanescent light generating surface, and decreases with decreasing distance to the medium facing surface. The plasmon exciting part includes a bottom surface of the bottom part. The first and second inclined surfaces include respective surfaces of the two sidewall parts, the respective surfaces lying on opposite sides in the direction parallel to the medium facing surface and the evanescent light generating surface. The magnetic pole may include a portion that is accommodated in a space formed by the bottom part and the two sidewall parts so as to be in contact with the bottom part and the two sidewall parts.

In the heat-assisted magnetic recording head of the present invention, $\theta_A$ and $\theta_B$ may satisfy a condition that $\cos\theta_A / \cos\theta_B$ has a value in the range of 0.2 to 0.9 inclusive and $\theta_B$ is greater than or equal to 20 degrees, where $\theta_A$ is the angle of inclination at an end of the shape changing portion closest to the medium facing surface, and $\theta_B$ is the angle of inclination at an end of the shape changing portion farthest from the medium facing surface.

The heat-assisted magnetic recording head of the present invention may further include a buffer part that is located between the evanescent light generating surface and the plasmon exciting part and has a refractive index lower than that of the core.

A head gimbal assembly of the present invention includes: the heat-assisted magnetic recording head of the present invention; and a suspension that supports the heat-assisted magnetic recording head. A magnetic recording device of the present invention includes: a magnetic recording medium; the heat-assisted magnetic recording head of the present invention; and a positioning device that supports the heat-assisted magnetic recording head and positions the same with respect to the magnetic recording medium.

In the heat-assisted magnetic recording head, the head gimbal assembly, and the magnetic recording device of the present invention, a surface plasmon is excited on the plasmon exciting part of the plasmon generator through coupling with the evanescent light generated from the evanescent light generating surface of the core of the waveguide. The near-field light generating part generates near-field light based on the surface plasmon. In the present invention, the outer surface of the plasmon generator includes the first and second inclined surfaces that are each connected to the plasmon exciting part. The first and second inclined surfaces increase in distance from each other with increasing distance from the plasmon exciting part. The plasmon generator includes the shape changing portion where the angle of inclination of each of the first and second inclined surfaces with respect to the evanescent light generating surface increases continuously with decreasing distance to the medium facing surface. The present invention thus makes it possible to use the light propagated through the core of the waveguide with high efficiency and to generate near-field light having a small spot diameter from the plasmon generator.

Other and further objects, features and advantages of the present invention will appear more fully from the following description.

BRIEF DESCRIPTION OF THE DRAWINGS

FIG. 22 is a characteristic chart showing the result of a second simulation that was performed using a model including the plasmon generator shown in FIG. 2.

FIG. 23 is a characteristic chart showing the result of a third simulation that was performed using a model including the plasmon generator shown in FIG. 17.

FIG. 24 is an explanatory diagram for explaining preferred shapes of the plasmon generator derived from the results of the second and third simulations.

DETAILED DESCRIPTION OF THE PREFERRED EMBODIMENTS

First Embodiment

Figure 6:
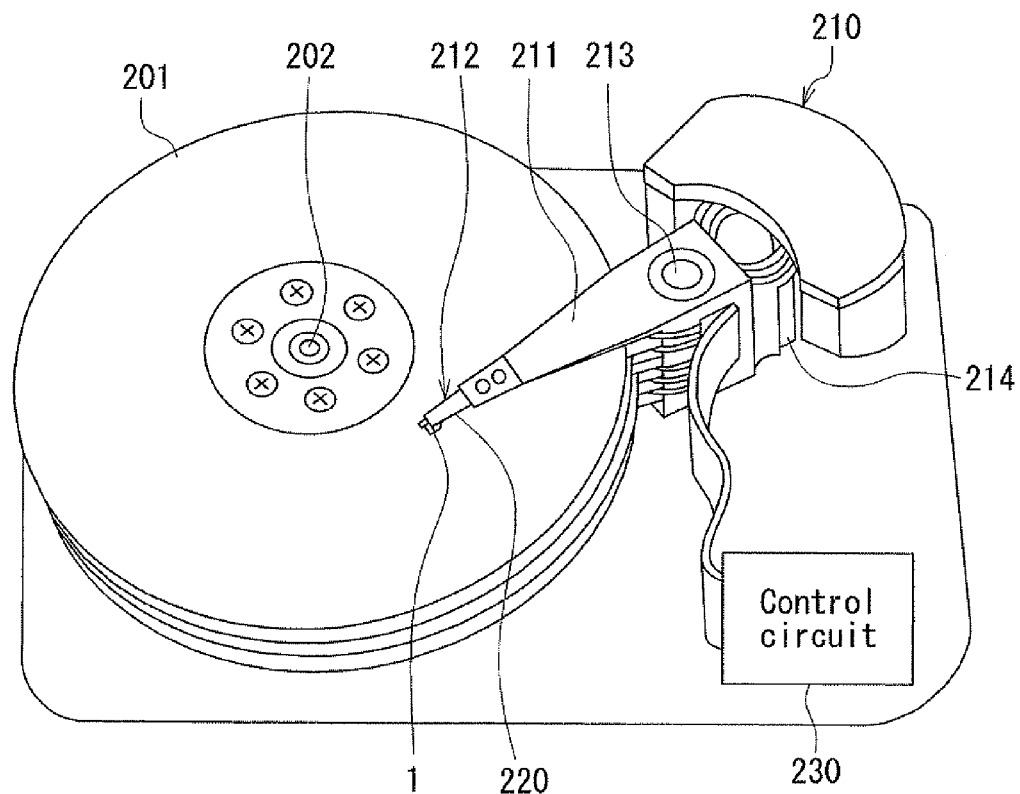
FIG. 6 is a perspective view showing a magnetic recording device according to the first embodiment of the invention.

Preferred embodiments of the present invention will now be described in detail with reference to the drawings. First, reference is made to FIG. 6 to describe a magnetic disk drive as a magnetic recording device according to a first embodiment of the invention. As shown in FIG. 6, the magnetic disk drive includes a plurality of magnetic disks 201 as a plurality of magnetic recording media, and a spindle motor 202 for rotating the plurality of magnetic disks 201. The magnetic disks 201 of the present embodiment are for use in perpendicular magnetic recording. Each magnetic disk 201 has such a structure that a soft magnetic backing layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a heat-assisted magnetic recording head 1 according to the present embodiment, and a suspension 220 that supports the heat-assisted magnetic recording head 1.

The assembly carriage device 210 is a device for positioning each heat-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single heat-assisted magnetic recording head 1.

The magnetic disk drive further includes a control circuit 230 that controls the read/write operations of the heat-assisted magnetic recording heads 1 and also controls the light emitting operation of a laser diode serving as a light source for generating laser light for heat-assisted magnetic recording described later.

Figure 7:
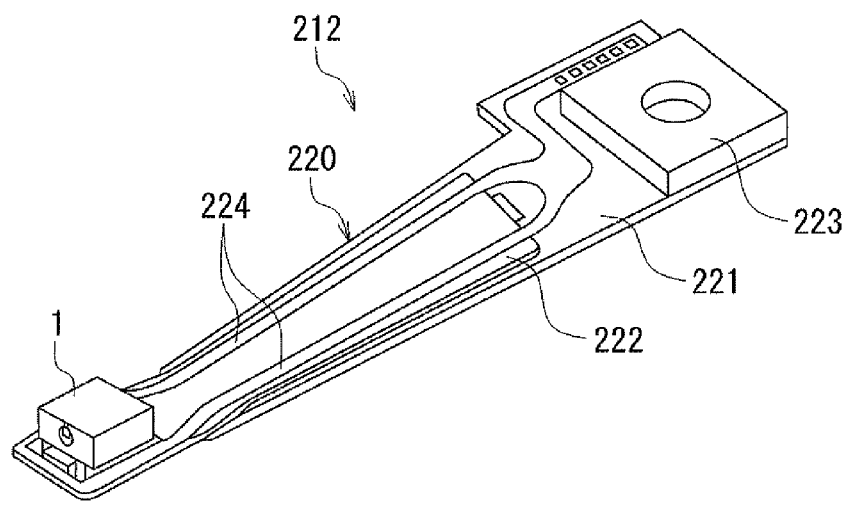
FIG. 7 is a perspective view showing a head gimbal assembly according to the first embodiment of the invention.

FIG. 7 is a perspective view showing the head gimbal assembly 212 of FIG. 6. As previously described, the head gimbal assembly 212 includes the heat-assisted magnetic recording head 1 and the suspension 220. The suspension 220 has a load beam 221, a flexure 222 fixed to the load beam 221 and having flexibility, a base plate 223 provided at the base part of the load beam 221, and a wiring member 224 provided on the load beam 221 and the flexure 222. The wiring member 224 includes a plurality of leads. The heat-assisted magnetic recording head 1 is fixed to the flexure 222 at the distal end of the suspension 220 such that the head 1 faces the surface of the magnetic disk 201 with a predetermined spacing (flying height). One end of the wiring member 224 is electrically connected to a plurality of terminals of the heat-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to the one having the configuration shown in FIG. 7. For example, the head gimbal assembly of the present invention may have an IC chip for driving the head that is mounted somewhere along the suspension 220.

Figure 8:
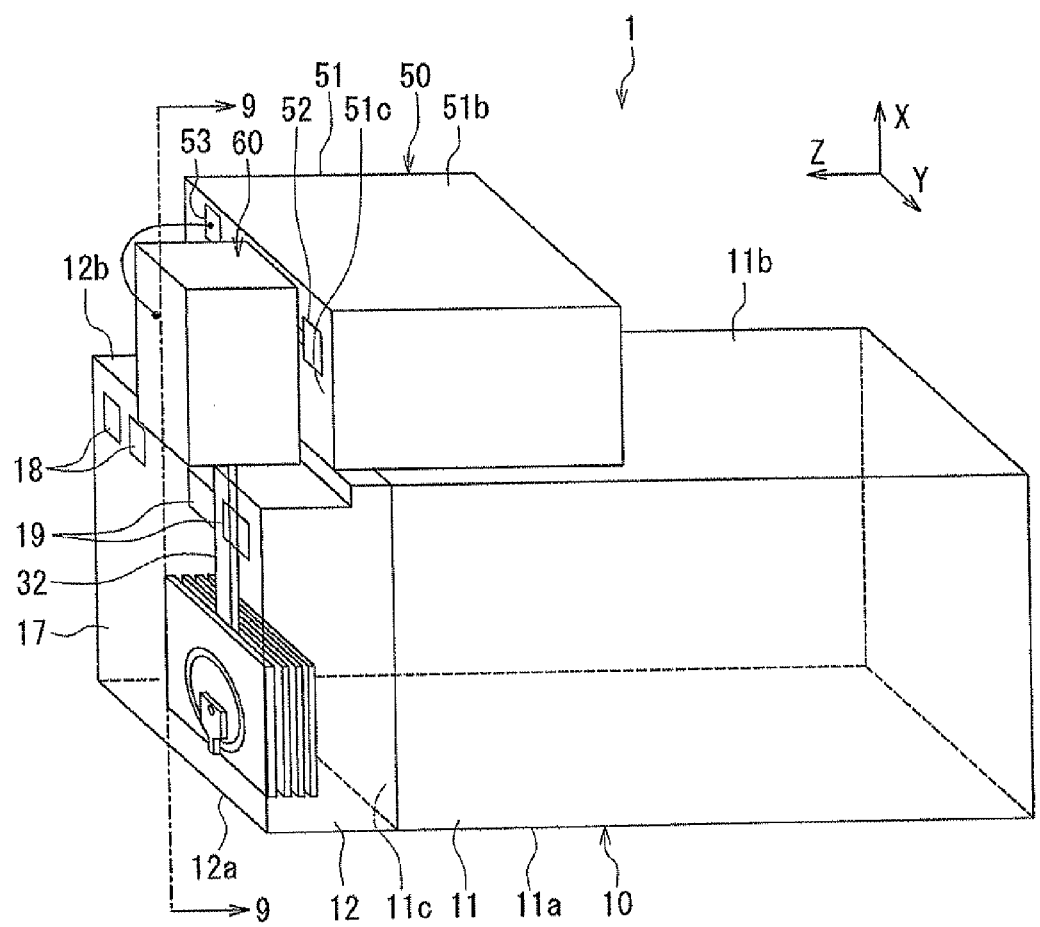
FIG. 8 is a perspective view showing the heat-assisted magnetic recording head according to the first embodiment of the invention.
Figure 9:
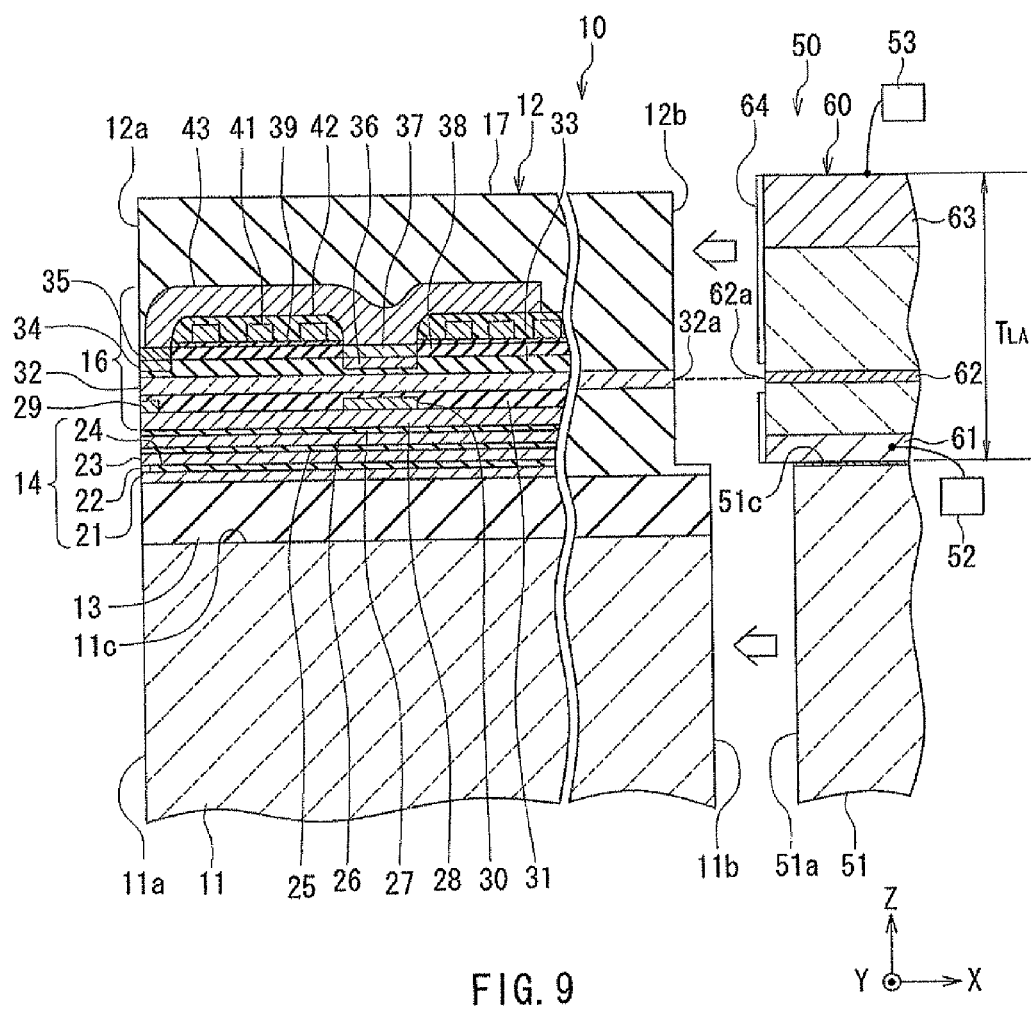
FIG. 9 shows a cross section taken along line 9-9 of FIG. 8.
Figure 10:
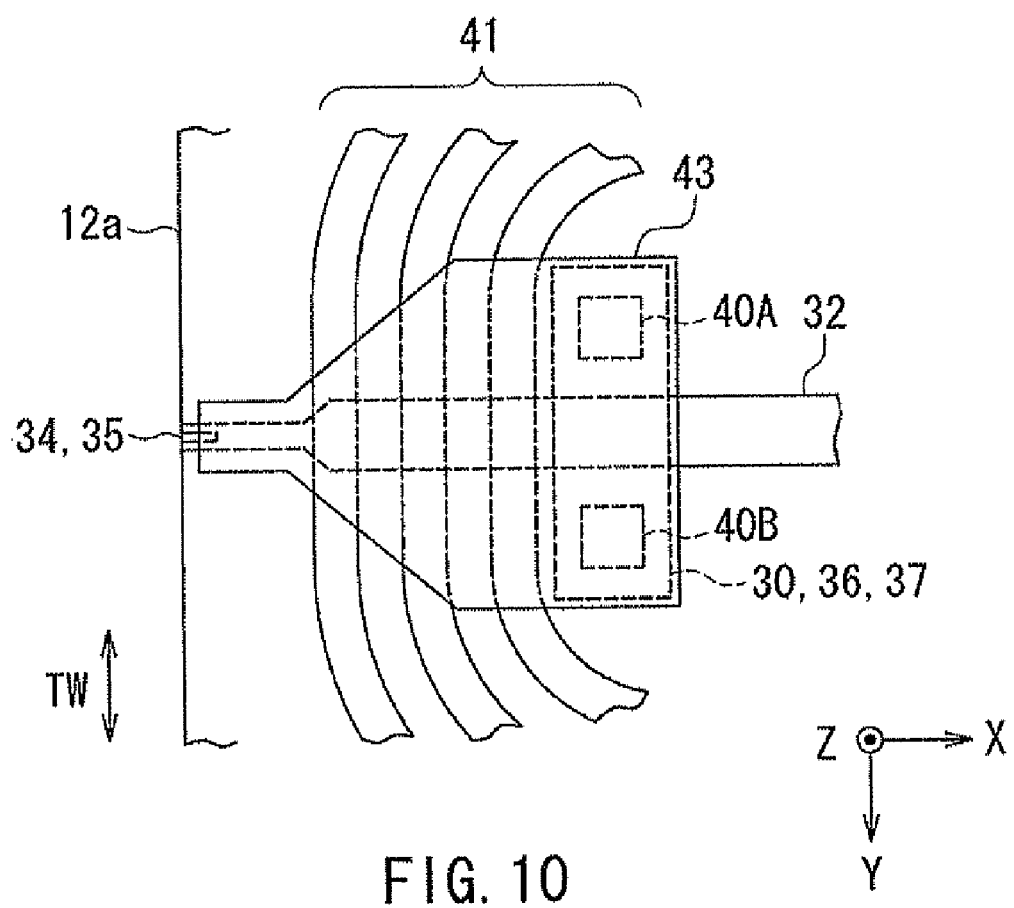
FIG. 10 is a plan view showing a part of the head unit of the heat-assisted magnetic recording head according to the first embodiment of the invention.

The configuration of the heat-assisted magnetic recording head 1 according to the present embodiment will now be described with reference to FIG. 8 to FIG. 10. FIG. 8 is a perspective view of the heat-assisted magnetic recording head 1. FIG. 9 shows a cross section taken along line 9-9 of FIG. 8. FIG. 10 is a plan view showing a part of a head unit of the heat-assisted magnetic recording head. The heat-assisted magnetic recording head 1 includes a slider 10 and a light source unit 50. FIG. 9 shows the state where the slider 10 and the light source unit 50 are separated from each other.

The slider 10 includes a slider substrate 11 and a head unit 12. The slider substrate 11 is rectangular-solid-shaped and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces that connect the medium facing surface 11a to the rear surface 11b. One of the four surfaces that connect the medium facing surface 11a to the rear surface 11b is an element-forming surface 11e. The element-forming surface 11c is perpendicular to the medium facing surface 11a. The head unit 12 is disposed on the element-forming surface 11c. The medium facing surface 11a is processed so as to obtain an appropriate flying height of the slider 10 with respect to the magnetic disk 201. The head unit 12 has a medium facing surface 12a that faces the magnetic disk 201, and a rear surface 12b opposite to the medium facing surface 12a. The medium facing surface 12a is parallel to the medium facing surface 11a of the slider substrate 11.

Where the components of the head unit 12 are concerned, with respect to a reference position, a position located in a direction that is perpendicular to the element-forming surface 11c and gets away from the element-forming surface 11c is defined as "above", and a position located in a direction opposite to the above-mentioned direction is defined as "below". Where the layers included in the head unit 12 are concerned, the surface closer to the element-forming surface 11c is defined as a "bottom surface," and the surface farther from the element-forming surface 11c as a "top surface."

Moreover, X direction, Y direction, Z direction, −X direction, −Y direction, and −Z direction will be defined as follows. The X direction is a direction perpendicular to the medium facing surface 11a and heading from the medium facing surface 11a toward the rear surface 11b. The Y direction is a direction parallel to the medium facing surface 11a and the element-forming surface 11c and heading from the back side to the front side of FIG. 9. The Z direction is a direction perpendicular to the element-forming surface 11c and getting away from the element-forming surface 11c. The −X direction, the −Y direction, and the −Z direction are opposite to the X direction, the Y direction, and the Z direction, respectively. As viewed from the slider 10, the magnetic disk 201 moves in the Z direction. The slider 10 has an air inflow end (a leading end) at the end of the medium facing surface 11a in the −Z direction. The slider 10 has an air outflow end (a trailing end) at the end of the medium facing surface 12a in the Z direction. Track width direction TW is a direction parallel to the Y direction.

The light source unit 50 includes a laser diode 60 serving as a light source for emitting laser light, and a rectangular-solid-shaped support member 51 that supports the laser diode 60. The support member 51 is made of, for example, a ceramic material such as aluminum oxide-titanium carbide ($Al_2O_3$—TiC). The support member 51 has a bonding surface 51a, a rear surface 51b opposite to the bonding surface 51a, and four surfaces that connect the bonding surface 51a to the rear surface 51b. One of the four surfaces that connect the bonding surface 51a to the rear surface 51b is a light-source-mounting surface 51c. The bonding surface 51a is the surface to be bonded to the rear surface 11b of the slider substrate 11. The light-source-mounting surface 51c is perpendicular to the bonding surface 51a and parallel to the element-forming surface 11c. The laser diode 60 is mounted on the light-source-mounting surface 51c. The support member 51 may have the function of a heat sink for dissipating heat generated by the laser diode 60, in addition to the function of supporting the laser diode 60.

As shown in FIG. 9, the head unit 12 includes an insulating layer 13 disposed on the element-forming surface 11c, and also includes a read head 14, a write head 16, and a protection layer 17 that are stacked in this order on the insulating layer 13. The insulating layer 13 and the protection layer 17 are each made of an insulating material such as $Al_2O_3$ (hereinafter, also referred to as alumina).

The read head 14 includes: a bottom shield layer 21 disposed on the insulating layer 13; an MR element 22 disposed on the bottom shield layer 21; a top shield layer 23 disposed on the MR element 22; and an insulating layer 24 disposed between the bottom shield layer 21 and the top shield layer 23 around the MR element 22. The bottom shield layer 21 and the top shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction nearly parallel to the plane of layers constituting the GMR element or the current-perpendicular-to-plane (CPP) type in which the sense current is fed in a direction nearly perpendicular to the plane of layers constituting the GMR element. If the MR element 22 is a TMR element or a CPP-type GMR element, the bottom shield layer 21 and the top shield layer 23 may also function as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head unit 12 further includes: an insulating layer 25 disposed on the top shield layer 23; a middle shield layer 26 disposed on the insulating layer 25; and an insulating layer 27 disposed on the middle shield layer 26. The middle shield layer 26 has the function of shielding the MR element 22 from a magnetic field produced in the write head 16. The insulating layers 25 and 27 are each made of an insulating material such as alumina. The middle shield layer 26 is made of a soft magnetic material. The insulating layer 25 and the middle shield layer 26 may be omitted.

The write head 16 of the present embodiment is for use in perpendicular magnetic recording. The write head 16 includes: a bottom yoke layer 28 disposed on the insulating layer 27; a bottom shield layer 29 disposed on the bottom yoke layer 28 in the vicinity of the medium facing surface 12a; and a coupling layer 30 disposed on the bottom yoke layer 28 at a position away from the medium facing surface 12a. The bottom yoke layer 28, the bottom shield layer 29, and the coupling layer 30 are each made of a soft magnetic material.

The write head 16 further includes a waveguide that includes a core 32 and a clad. The clad includes a clad layer 31 and a clad layer 33. The clad layer 31 covers the bottom yoke layer 28, the bottom shield layer 29, and the coupling layer 30. The core 32 lies on the clad layer 31. The clad layer 33 covers the clad layer 31 and the core 32. The core 32 extends in the direction perpendicular to the medium facing surface 12a (the X direction). The core 32 has an incident end 32a, an end face closer to the medium facing surface 12a, a top surface, a bottom surface, and two side surfaces. The end face of the core 32 may be located in the medium facing surface 12a or away from the medium facing surface 12a. FIG. 9 shows an example where the end face of the core 32 is located in the medium facing surface 12a. The core 32 propagates laser light that is emitted from the laser diode 60 and incident on the incident end 32a.

The core 32 is made of a dielectric material that transmits the laser light. Each of the clad layers 31 and 33 is made of a dielectric material and has a refractive index lower than that of the core 32. For example, if the laser light has a wavelength of 600 nm and the core 32 is made of $Al_2O_3$ (refractive index n=1.63), the clad layers 31 and 33 may be made of $SiO_2$ (refractive index n=1.46). If the core 32 is made of tantalum oxide such as $Ta_2O_5$ (n=2.16), the clad layers 31 and 33 may be made of $SiO_2$ (n=1.46) or $Al_2O_3$ (n=1.63).

The write head 16 further includes: a plasmon generator 34 disposed above the core 32 near the medium facing surface 12a; and a magnetic pole 35 disposed at such a position that the plasmon generator 34 is interposed between the magnetic pole 35 and the core 32. The plasmon generator 34 is made of a conductive material such as metal. For example, the plasmon generator 34 may be made of one element selected from the group consisting of Pd, Pt, Rh, Ir, Ru, Au, Ag, Cu, and Al, or of an alloy composed of two or more of these elements. The magnetic pole 35 is made of a soft magnetic material, or a magnetic metal material in particular. The shapes and layout of the core 32, the plasmon generator 34 and the magnetic pole 35 will be detailed later.

The write head 16 further includes: a coupling layer 36 embedded in the clad layer 33 at a position away from the medium facing surface 12a; and a coupling layer 37 lying on the coupling layer 36. The coupling layers 36 and 37 are located above the coupling layer 30. The coupling layers 36 and 37 are each made of a soft magnetic material.

As shown in FIG. 10, the write head 16 further includes two coupling portions 40A and 40B that are embedded in the clad layers 31 and 33. The coupling portions 40A and 40B are each made of a soft magnetic material. The coupling portions 40A and 40B are located on opposite sides of the core 32 in the track width direction TW, each at a distance from the core 32. The bottom surfaces of the coupling portions 40A and 40B are in contact with the top surface of the coupling layer 30. The top surfaces of the coupling portions 40A and 40B are in contact with the bottom surface of the coupling layer 36.

The write head 16 further includes: an insulating layer 38 disposed around the magnetic pole 35 and the coupling layer 37; an insulating layer 39 disposed on the insulating layer 38; a coil 41 disposed on the insulating layer 39; and an insulating layer 42 covering the coil 41. The insulating layers 38 and 39 are each made of an insulating material such as alumina. The coil 41 is planar spiral-shaped and wound around the coupling layer 37. The coil 41 produces a magnetic field corresponding to data to be written on the magnetic disk 201. The coil 41 is made of a conductive material such as copper. The insulating layer 42 is made of photoresist, for example.

The write head 16 further includes a top yoke layer 43. The top yoke layer 43 is disposed over the magnetic pole 35, the insulating layer 42 and the coupling layer 37. The top yoke layer 43 is in contact with the top surface of the magnetic pole 35 at a position near the medium facing surface 12a, and in contact with the top surface of the coupling layer 37 at a position away from the medium facing surface 12a.

In the write head 16, the bottom shield layer 29, the bottom yoke layer 28, the coupling layer 30, the coupling portions 40A and 4013, the coupling layers 36 and 37, the top yoke layer 43, and the magnetic pole 35 form a magnetic path for passing a magnetic flux corresponding to the magnetic field produced by the coil 41. The magnetic pole 35 has an end face located in the medium facing surface 12a, allows the magnetic flux corresponding to the magnetic field produced by the coil 41 to pass, and produces a write magnetic field for writing data on the magnetic disk 201 by means of the perpendicular magnetic recording system. The bottom shield layer 29 takes in a magnetic flux that is generated from the end face of the magnetic pole 35 and that expands in directions other than the direction perpendicular to the plane of the magnetic disk 201, and thereby prevents the magnetic flux from reaching the magnetic disk 201.

As shown in FIG. 9, the protection layer 17 is disposed to cover the write head 16. As shown in FIG. 8, the head unit 12 further includes a pair of terminals 18 that are disposed on the top surface of the protection layer 17 and electrically connected to the MR element 22, and another pair of terminals 19 that are disposed on the top surface of the protection layer 17 and electrically connected to the coil 41. These terminals 18 and 19 are electrically connected to the plurality of pad-shaped terminals of the wiring member 224 shown in FIG. 7.

The laser diode 60 may be a laser diode of InP type, GaAs type, GaN type or the like that is commonly used for such applications as communications, optical disc storage and material analysis. The laser diode 60 may emit laser light of any wavelength within the range of, for example, 375 nm to 1.7 μm. Specifically, the laser diode 60 may be an InGaAsP/InP quaternary mixed crystal laser diode having an emittable wavelength range of 1.2 to 1.67 μm, for example.

As shown in FIG. 9, the laser diode 60 has a multilayer structure including a lower electrode 61, an active layer 62, and an upper electrode 63. A reflecting layer 64 made of, for example, $SiO_2$ or $Al_2O_3$, is formed on two cleavage planes of the multilayer structure so as to excite oscillation by total reflection of light. The reflecting layer 64 has an opening for emitting laser light in the position of the active layer 62 including an emission center 62a. The laser diode 60 has a thickness $T_{LA}$ of around 60 to 200 μm, for example.

The light source unit 50 further includes a terminal 52 disposed on the light-source-mounting surface 51c and electrically connected to the lower electrode 61, and a terminal 53 disposed on the light-source-mounting surface 51c and electrically connected to the upper electrode 63. These terminals 52 and 53 are electrically connected to the plurality of pad-shaped terminals of the wiring member 224 shown in FIG. 7. When a predetermined voltage is applied to the laser diode 60 through the terminals 52 and 53, laser light is emitted from the emission center 62a of the laser diode 60. The laser light to be emitted from the laser diode 60 is preferably TM-mode polarized light whose electric field oscillates in a direction perpendicular to the plane of the active layer 62.

The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

The light source unit 50 is fixed to the slider 10 by bonding the bonding surface 51a of the support member 51 to the rear surface 11b of the slider substrate 11, as shown in FIG. 9. The laser diode 60 and the core 32 are positioned so that the laser light emitted from the laser diode 60 will be incident on the incident end 32a of the core 32.

Figure 1:
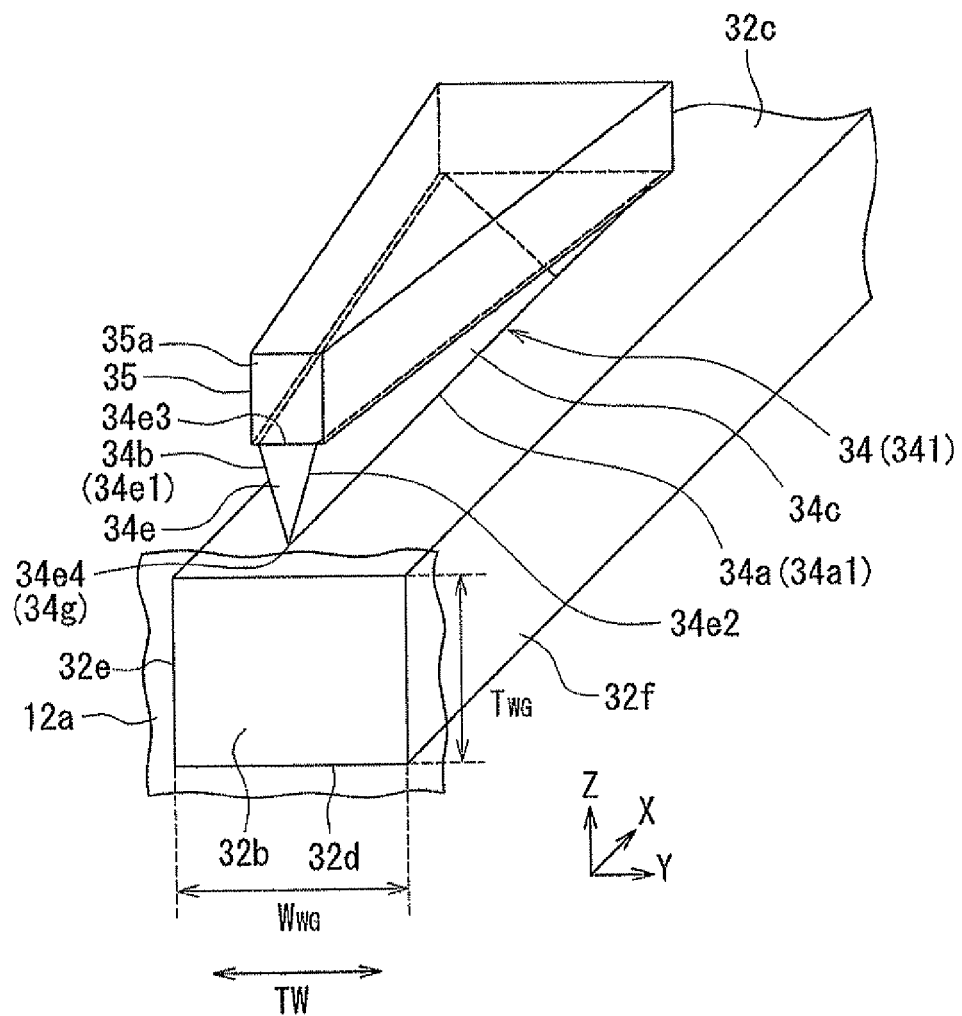
FIG. 1 is a perspective view showing a waveguide's core, a plasmon generator, and a magnetic pole of a heat-assisted magnetic recording head according to a first embodiment of the invention.
Figure 2:
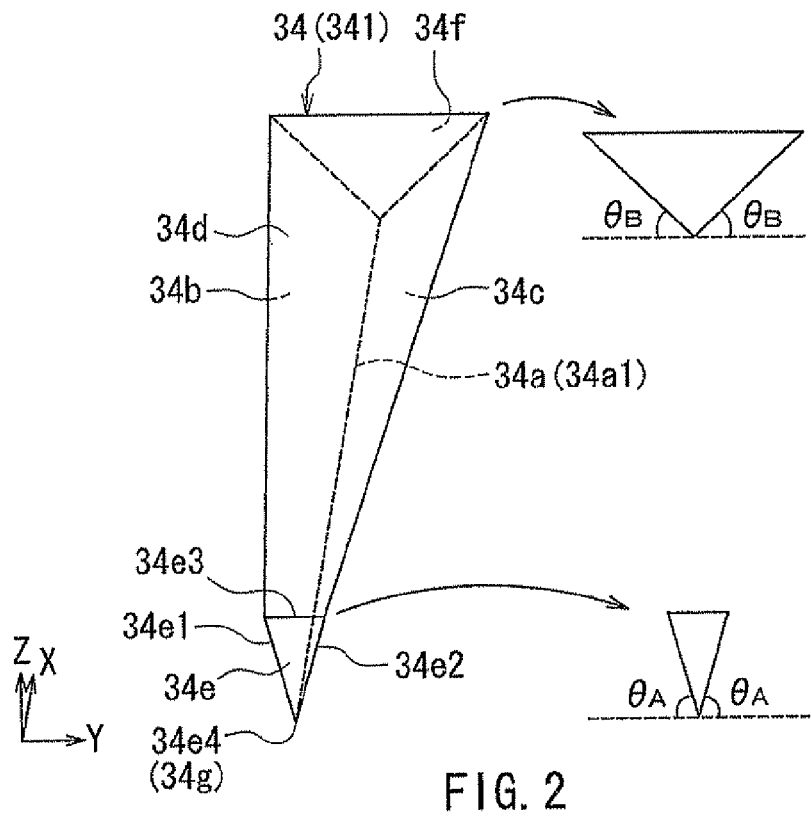
FIG. 2 is a perspective view showing the plasmon generator of FIG. 1.
Figure 3:
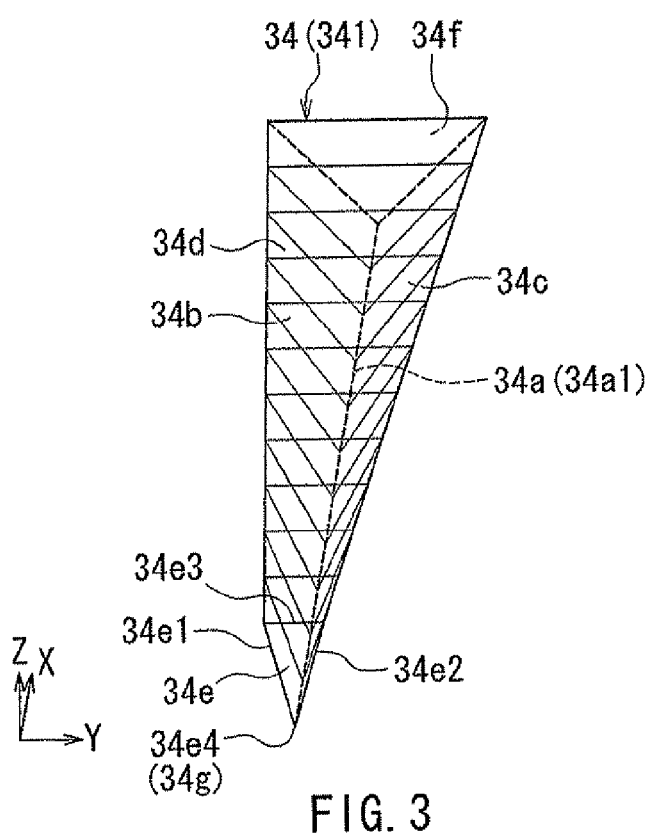
FIG. 3 is an explanatory diagram showing the shapes of a plurality of cross sections of the plasmon generator shown in FIG. 2 at respective different distances from the medium facing surface.
Figure 4:
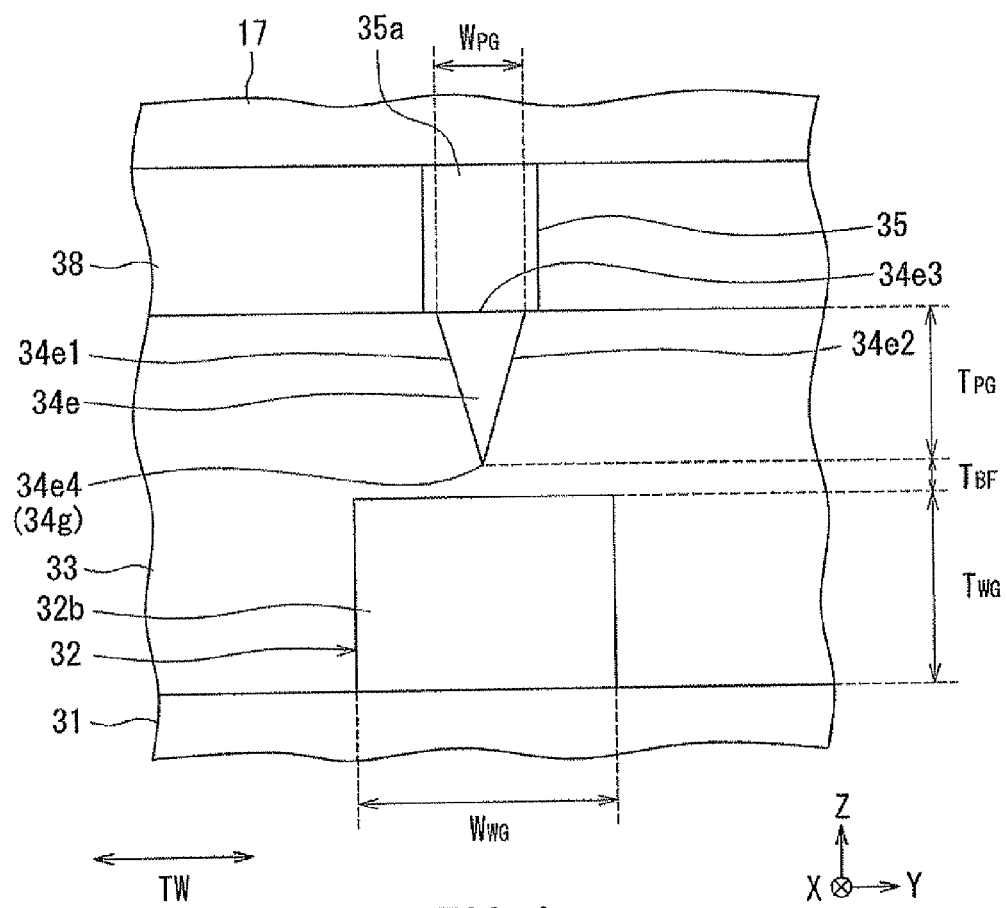
FIG. 4 is a front view showing a part of the medium facing surface of a head unit of the heat-assisted magnetic recording head according to the first embodiment of the invention.
Figure 5:
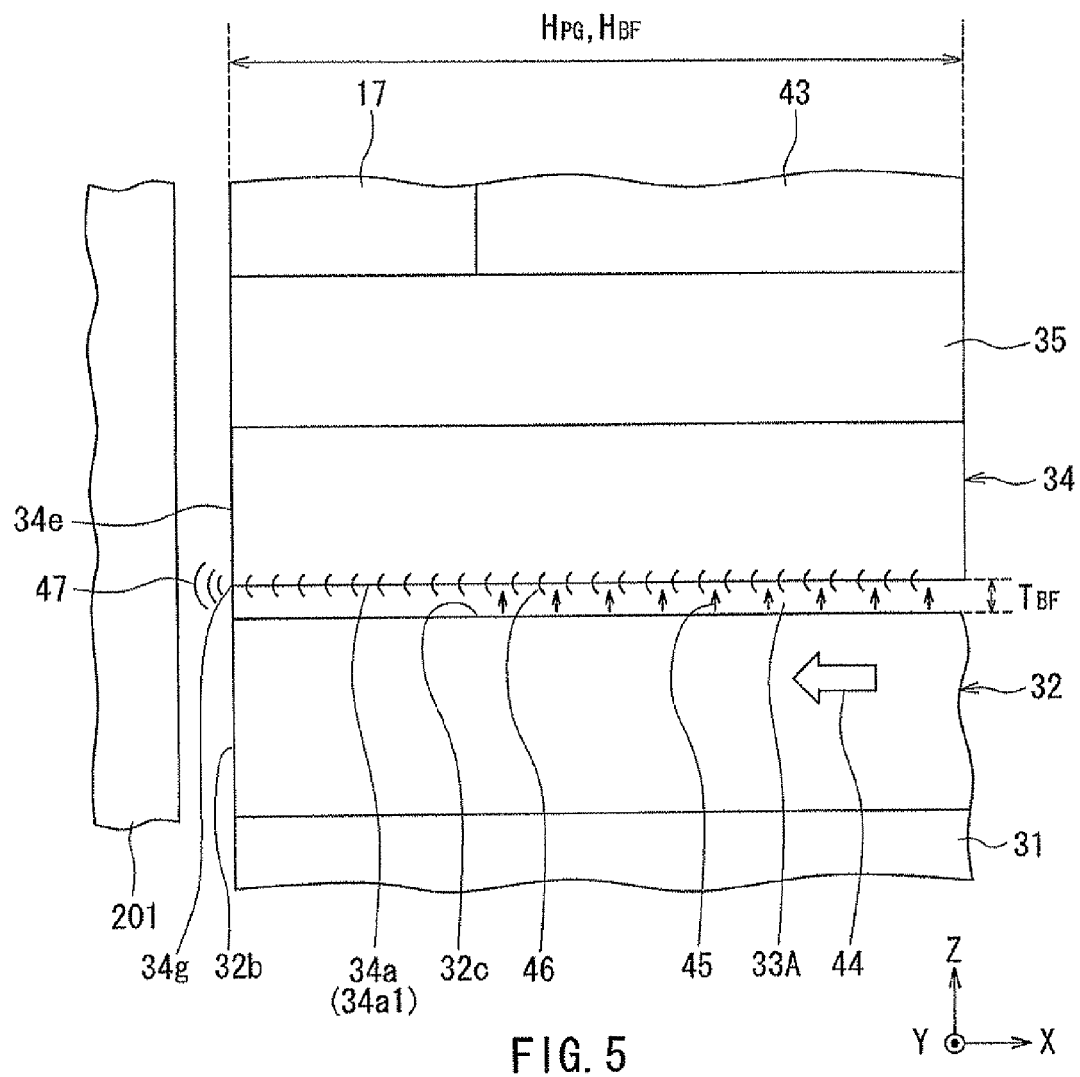
FIG. 5 is a cross-sectional view showing the core, the plasmon generator, and the magnetic pole of the heat-assisted magnetic recording head according to the first embodiment of the invention.

The shapes and layout of the core 32, the plasmon generator 34, and the magnetic pole 35 will now be described in detail with reference to FIG. 1 to FIG. 5. FIG. 1 is a perspective view showing the core 32, the plasmon generator 34, and the magnetic pole 35. FIG. 2 is a perspective view showing the plasmon generator 34 of FIG. 1. FIG. 3 is an explanatory diagram showing the shapes of a plurality of cross sections of the plasmon generator 34 shown in FIG. 2 at respective different distances from the medium facing surface 12a. FIG. 4 is a front view showing a part of the medium facing surface 12a of the head unit 12. FIG. 5 is a cross-sectional view showing the core 32, the plasmon generator 34, and the magnetic pole 35.

Aside from the incident end 32a shown in FIG. 9, the core 32 further has: an end face 32b that is closer to the medium facing surface 12a; an evanescent light generating surface 32c, which is a top surface; a bottom surface 32d; and two side surfaces 32e and 32f, as shown in FIG. 1. The evanescent light generating surface 32c generates evanescent light based on the light propagated through the core 32. FIG. 1 to FIG. 5 show an example where the end face 32b is located in the medium facing surface 12a. The end face 32b may be located away from the medium facing surface 12a, however.

As shown in FIG. 1, the plasmon generator 34 has a near-field light generating part 34g located in the medium facing surface 12a. As shown in FIG. 1 and FIG. 2, the plasmon generator 34 has the shape of a triangular prism having an outer surface as described below. The outer surface of the plasmon generator 34 includes a plasmon exciting part 34a, a first inclined surface 34b, a second inclined surface 34c, and a top surface 34d. The plasmon exciting part 34a faces the evanescent light generating surface 32c with a predetermined distance therebetween. The first and second inclined surfaces 34b and 34c are each connected to the plasmon exciting part 34a. The first and second inclined surfaces 34b and 34c increase in distance from each other with increasing distance from the plasmon exciting part 34a. In the present embodiment, the plasmon exciting part 34a includes a propagation edge 34a1 that is formed by the first inclined surface 34b and the second inclined surface 34c meeting each other. In the example shown in FIG. 1 and FIG. 2, the entire plasmon exciting part 34a is composed of the propagation edge 34a1. As will be described later, the propagation edge 34a1 propagates plasmons. The near-field light generating part 34g lies at an end of the propagation edge 34a1. In a cross section parallel to the medium facing surface 12a, the propagation edge 34a1 may have the shape of a perfectly pointed edge whereas it may have an arc shape in a microscopic view. The top surface 34d connects the respective top ends of the first inclined surface 34b and the second inclined surface 34c to each other.

The outer surface of the plasmon generator 34 further includes a front end face 34e located in the medium facing surface 12a and a rear end face 34f opposite to the front end face 34e. The front end face 34e and the rear end face 34f each connect the first inclined surface 34b, the second inclined surface 34c, and the top surface 34d to each other.

The front end face 34e has a triangular shape. The front end face 34e has a first side 34e1 that lies at an end of the first inclined surface 34b, a second side 34e2 that lies at an end of the second inclined surface 34c, a third side 34e3 that lies at an end of the top surface 34d, and a tip 34e4 that is formed by contact of the first side 34e1 and the second side 34e2 with each other and forms the near-field light generating part 34g. The tip 34a4 may have the shape of a perfectly pointed edge whereas it may have an arc shape in a microscopic view.

The plasmon generator 34 includes a shape changing portion 341 where the angle of inclination of each of the first and second inclined surfaces 34b and 34c with respect to the evanescent light generating surface 32c increases continuously with decreasing distance to the medium facing surface 12a. At least a part of the propagation edge 34a1 lies in the shape changing portion 341. In the example shown in FIG. 2 and FIG. 3, the entire plasmon generator 34 is composed of the shape changing portion 341. In this example, the entire propagation edge 34a1 therefore lies in the shape changing portion 341. In the shape changing portion 341, when compared at the same distance from the medium facing surface 12a, the angle of inclination of the first inclined surface 34b with respect to the evanescent light generating surface 32c is equal to that of the second inclined surface 34c with respect to the evanescent light generating surface 32c. As will be shown in a second modification example later, the plasmon generator 34 may include portions other than the shape changing portion 341.

Even if the end face of the core 32 closer to the medium facing surface 12a is located at a distance from the medium facing surface 12a, at least a part of the plasmon exciting part 34a (propagation edge 34a1) lying in the shape changing portion 341 faces the evanescent light generating surface 32c. If the end face of the core 32 closer to the medium facing surface 12a is located at a distance from the medium facing surface 12a, the plasmon generator 34 includes a portion where the plasmon exciting part 34a (propagation edge 34a1) does not face the evanescent light generating surface 32c. In such a portion, the angle of inclination of each of the first and second inclined surfaces 34b and 34c with respect to the evanescent light generating surface 32c will be defined as the angle that each of the first and second inclined surfaces 34b and 34c forms with respect to a virtual plane that is extended from the evanescent light generating surface 32c.

In the example shown in FIG. 2 and FIG. 3, each of the first inclined surface 34b and the second inclined surface 34c has an end located in the medium facing surface 12a. The angle of inclination of each of the first and second inclined surfaces 34b and 34c with respect to the evanescent light generating surface 32c peaks at the medium facing surface 12a. In the example shown in FIG. 2 and FIG. 3, the entire plasmon generator 34 is composed of the shape changing portion 341. The shape changing portion 341 therefore has an end located in the medium facing surface 12a.

As shown in FIG. 2, the angle of inclination of each of the first and second inclined surfaces 34b and 34c with respect to the evanescent light generating surface 32c at the end of the shape changing portion 341 closest to the medium facing surface 12a, i.e., at the front end face 34e, will be represented by $\theta_A$. On the other hand, the angle of inclination of each of the first and second inclined surfaces 34b and 34c with respect to the evanescent light generating surface 32c at the end of the shape changing portion 341 farthest from the medium facing surface 12a, i.e., at the rear end face 34f, will be represented by $\theta_B$. $\theta_A$ is greater than $\theta_B$. As shown in FIG. 3, in any cross section of the shape changing portion 341 parallel to the medium facing surface 12a, the angle of inclination of each of the first and second inclined surfaces 34b and 34c with respect to the evanescent light generating surface 32c falls between $\theta_A$ and $\theta_B$ inclusive, and continuously increases as the position of the cross section gets closer to the medium facing surface 12a.

In the plasmon generator 34 of the present embodiment, the distance between the plasmon exciting part 34a (propagation edge 34a1) and the top surface 34d is constant or almost constant regardless of the distance from the medium facing surface 12a. The maximum Y-direction width of any cross section of the shape changing portion 341 parallel to the medium facing surface 12a therefore decreases as the position of the cross section gets closer to the medium facing surface 12a.

As shown in FIG. 5, a part of the clad layer 33 that is interposed between the evanescent light generating surface 32c and the plasmon exciting part 34a forms a buffer part 33A having a refractive index lower than that of the core 32.

As shown in FIG. 1, the magnetic pole 35 has an end face 35a located in the medium facing surface 12a. The end face 35a has a rectangular shape, for example. The bottom surface of the magnetic pole 35 is in contact with the top surface 34d of the plasmon generator 34.

As shown in FIG. 1, the width of the core 32 in the track width direction TW (the Y direction) in the vicinity of the plasmon generator 34 will be denoted by the symbol $W_{WG}$. The thickness (dimension in the Z direction) of the core 32 in the vicinity of the plasmon generator 34 will be denoted by the symbol $T_{WG}$. $W_{WG}$ falls within the range of 0.3 to 100 μm, for example. $T_{WG}$ falls within the range of 0.1 to 4 μm, for example. As shown in FIG. 10, the core 32 excluding the part in the vicinity of the plasmon generator 34 may have a width greater than $W_{WG}$.

As shown in FIG. 4, the dimension of the plasmon generator 34 in the track width direction TW (the Y direction) at the medium facing surface 12a will be denoted by the symbol $W_{PG}$. The dimension of the plasmon generator 34 in the Z direction at the medium facing surface 12a will be denoted by the symbol $T_{PG}$. Both $W_{PG}$ and $T_{PG}$ are sufficiently smaller than the wavelength of laser light to be propagated through the core 32. Both $W_{PG}$ and $T_{PG}$ fall within the range of 10 to 100 nm, for example.

As shown in FIG. 5, the length of the plasmon generator 34 in the X direction will be denoted by the symbol $H_{PG}$. $H_{PG}$ falls within the range of 0.6 to 4.0 μm, for example. The length of the shape changing portion 341 of the plasmon generator 34 in the X direction falls within the range of 0.2 to 4.0 μm, for example.

As shown in FIG. 5, the X-direction length of a portion of the plasmon exciting part 34a (propagation edge 34a1) of the plasmon generator 34 that faces the evanescent light generating surface 32c will be denoted by the symbol $H_{BF}$. The distance between the plasmon exciting part 34a (propagation edge 34a1) and the evanescent light generating surface 32c will be denoted by the symbol $T_{BF}$. Both $H_{BF}$ and $T_{BF}$ are important parameters in achieving appropriate excitation and propagation of surface plasmons. $H_{BF}$ preferably falls within the range of 0.6 to 4.0 μm, and is preferably greater than the wavelength of the laser light to be propagated through the core 32. In the example shown in FIG. 5, the end face 32b of the core 32 is located in the medium facing surface 12a, so that $H_{BF}$ is equal to $H_{PG}$. $T_{BF}$ preferably falls within the range of 10 to 100 nm. As shown in FIG. 4, the distance between the tip 34e4 of the front end face 34e of the plasmon generator 34 and the end face 32b of the core 32 is equal to $T_{BF}$.

Reference is now made to FIG. 5 to describe the principle of generation of near-field light in the present embodiment and the principle of heat-assisted magnetic recording using the near-field light. Laser light 44 emitted from the laser diode 60 is propagated through the core 32 of the waveguide to reach the vicinity of the buffer part 33A. Here, the laser light 44 is totally reflected at the interface between the core 32 and the buffer part 33A. This generates evanescent light 45 permeating into the buffer part 33A. Then, the evanescent light 45 and fluctuations of charges on at least the plasmon exciting part 34a (propagation edge 34a1) of the outer surface of the plasmon generator 34 are coupled with each other to induce a surface plasmon polariton mode. In this way, surface plasmons 46 are excited at least on the plasmon exciting part 34a (propagation edge 34a1) through coupling with the evanescent light 45 generated from the evanescent light generating surface 32c.

The surface plasmons 46 excited at least on the plasmon exciting part 34a (propagation edge 34a1) of the outer surface of the plasmon generator 34 are transformed into edge plasmons to propagate along the propagation edge 34a1 to the near-field light generating part 34g. Consequently, the edge plasmons concentrate at the near-field light generating part 34g, and near-field light 47 occurs from the near-field light generating part 34g based on the edge plasmons. The near-field light 47 is projected toward the magnetic disk 201, reaches the surface of the magnetic disk 201, and heats a part of the magnetic recording layer of the magnetic disk 201. This lowers the coercivity of the part of the magnetic recording layer. In heat-assisted magnetic recording, the part of the magnetic recording layer with the lowered coercivity is subjected to a write magnetic field produced by the magnetic pole 35 for data writing.

Figure 11:
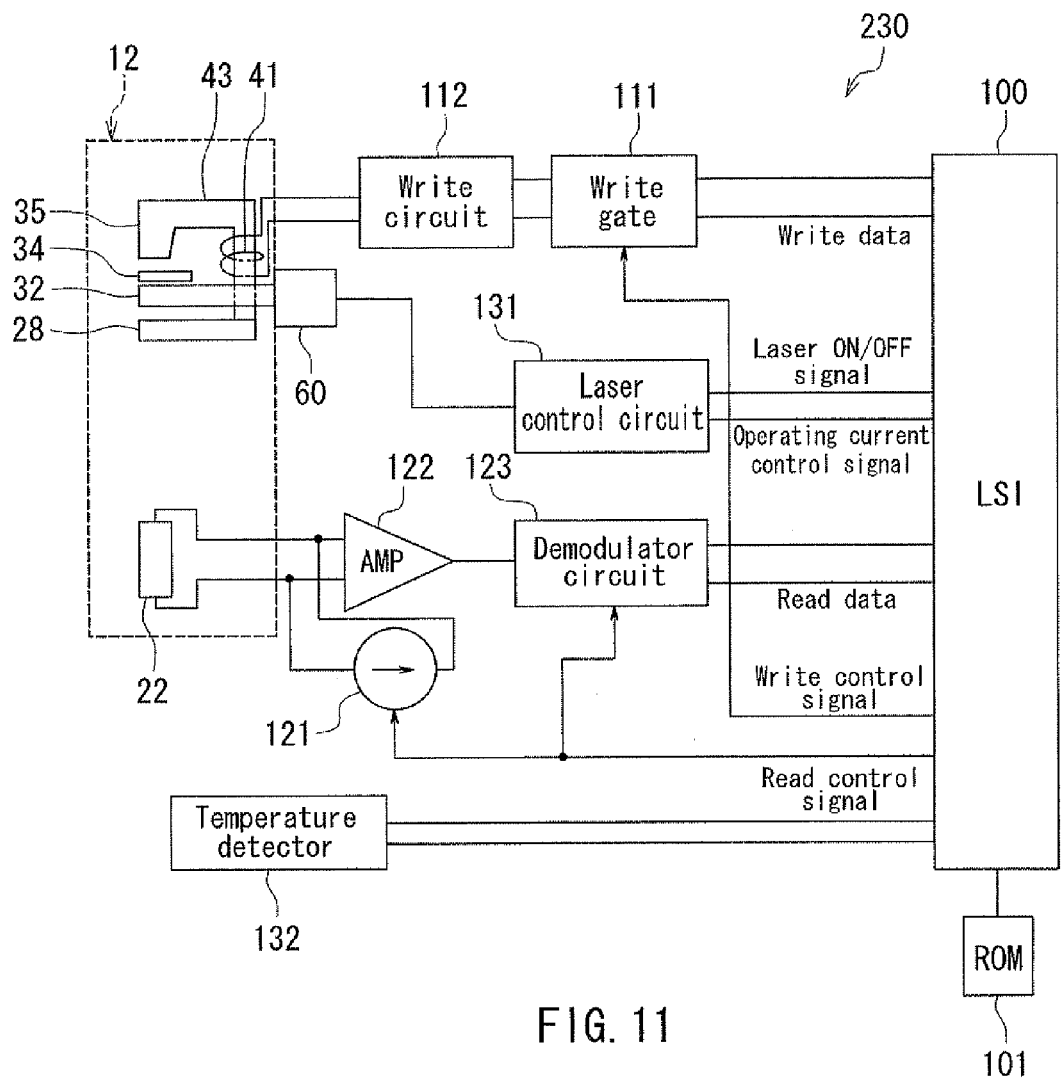
FIG. 11 is a block diagram showing the circuit configuration of the magnetic recording device according to the first embodiment of the invention.

Reference is now made to FIG. 11 to describe the circuit configuration of the control circuit 230 shown in FIG. 6 and the operation of the heat-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 41.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a write operation, the control LSI 100 supplies write data to the write gate 111. The write gate 111 supplies the write data to the write circuit 112 only when the write control signal indicates a write operation. According to the write data, the write circuit 112 passes a write current through the coil 41. Consequently, the magnetic pole 35 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and the laser light is propagated through the core 32. According to the principle of generation of near-field light described previously, the near-field light 47 occurs from the near-field light generating part 34g of the plasmon generator 34. The near-field light 47 heats a part of the magnetic recording layer of the magnetic disk 201, thereby lowering the coercivity of that part. When writing, the part of the magnetic recording layer with the lowered coercivity is subjected to the write magnetic field produced by the magnetic pole 35 for performing data writing.

On the basis of such factors as the temperature of the magnetic recording layer of the magnetic disk 201 measured by the temperature detector 132, the control LSI 100 consults the control table stored in the ROM 101 to determine the value of the operating current of the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60. The control table may further contain data that indicates the relationship between the operating current value and a temperature increase of the magnetic recording layer heated by the near-field light 47, and data that indicates the temperature dependence of the coercivity of the magnetic recording layer.

As shown in FIG. 11, the control circuit 230 has the signal system for controlling the laser diode 60, i.e., the signal system consisting of the laser ON/OFF signal and the operating current control signal, independent of the control signal system intended for read/write operations. This configuration makes it possible to implement various modes of energization of the laser diode 60, not only to energize the laser diode 60 simply in association with a write operation. It should be noted that the circuit configuration of the control circuit 230 is not limited to the one shown in FIG. 11.

Next, a method of manufacturing the slider 10 of the present embodiment will be described briefly. The method of manufacturing the slider 10 includes the steps of forming components of a plurality of sliders 10 other than the slider substrates 11 on a substrate that includes portions to become the slider substrates 11 of the plurality of sliders 10, thereby fabricating a substructure that includes pre-slider portions arranged in a plurality of rows, the pre-slider portions being intended to become the sliders 10 later; and forming the plurality of sliders 10 by cutting the substructure to separate the plurality of pre-slider portions from each other. In the step of forming the plurality of sliders 10, the surfaces formed by cutting are polished into the medium facing surfaces 11a and 12a.

Reference is now made to FIG. 12A to FIG. 16C to describe an example of the method of forming the plasmon generator 34. FIG. 12A to FIG. 16C each show a part of a stack of layers fabricated in the process of forming the plasmon generator 34. Of FIG. 12A to FIG. 16C, FIG. nA (n is any integer between 12 and 16 inclusive) is a plan view of a part of the stack. FIG. nB is a cross-sectional view of a part of the stack at the position shown by the line nB-nB in FIG. nA. FIG. nC is a cross-sectional view of a part of the stack at the position shown by the line nC-nC in FIG. nA. The position shown by the line nB-nB is the position where the medium facing surface 12a is to be formed.

Figure 12A:
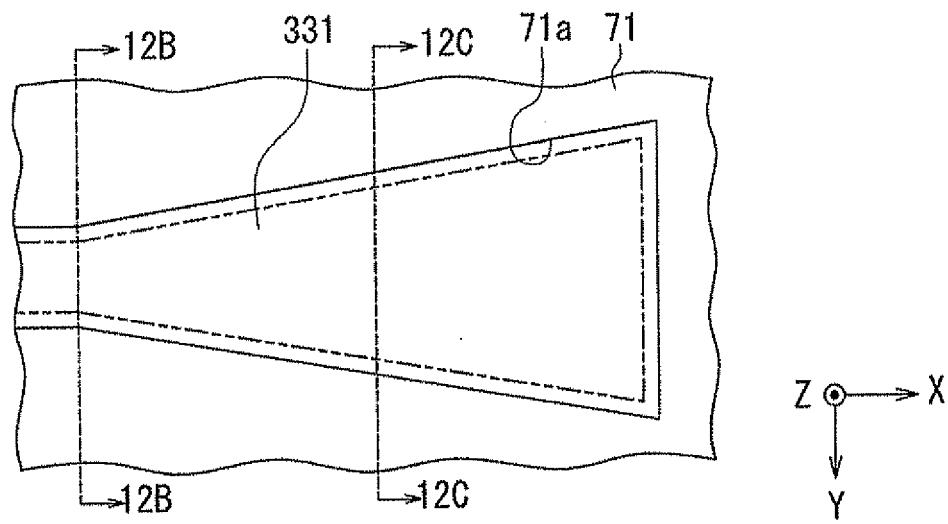
FIG. 12A to FIG. 12C are explanatory diagrams showing a step of a method of forming the plasmon generator of the first embodiment of the invention.
Figure 12B:
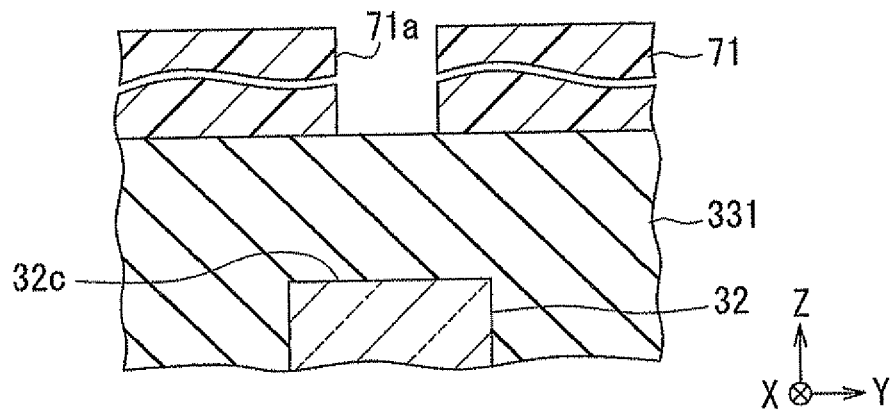
Figure 12C:
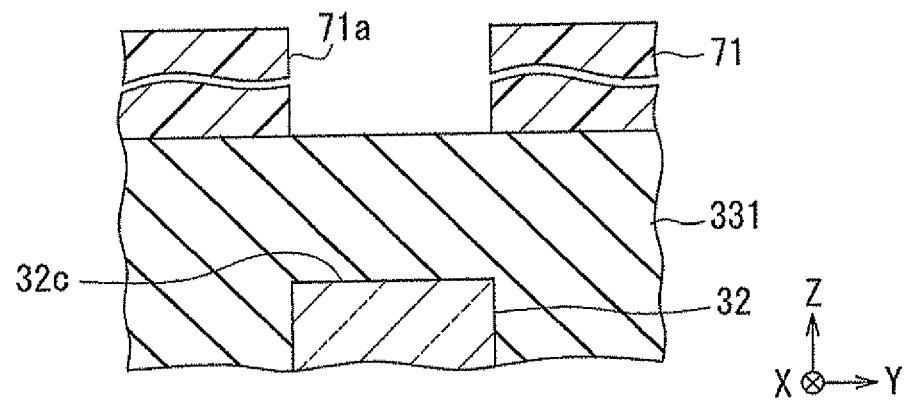

FIG. 12A to FIG. 12C show a step of the method of forming the plasmon generator 34. In this step, the core 32 of the waveguide is initially formed on the clad layer 31 and then a dielectric layer 331 is formed to cover the clad layer 31 and the core 32. The material of the dielectric layer 331 is the same as that of the clad layer 33. Next, an etching mask 71 made of photoresist or metal is formed on the dielectric layer 331. The etching mask 71 has an opening 71a that has a size slightly larger than the outer edge (shown by a chain double-dashed line in FIG. 12A) of the top end of the plasmon generator 34 to be formed later. The width of the opening 71a in the Y direction continuously decreases with decreasing distance to the position where the medium facing surface 12a is to be formed.

Figure 13A:
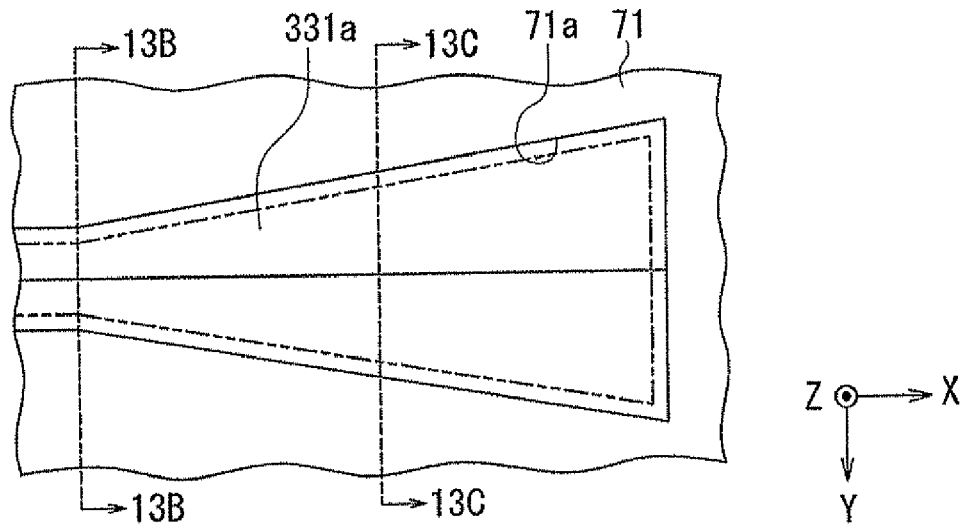
FIG. 13A to FIG. 13C are explanatory diagrams showing a step that follows the step shown in FIG. 12A to FIG. 12C.
Figure 13B:
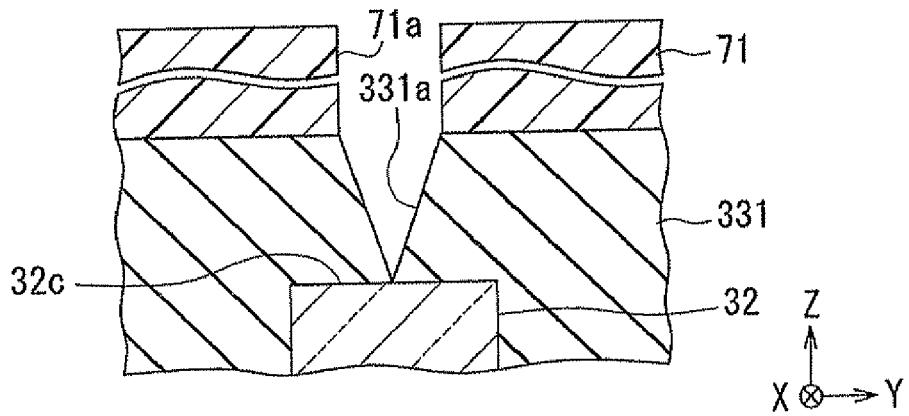
Figure 13C:
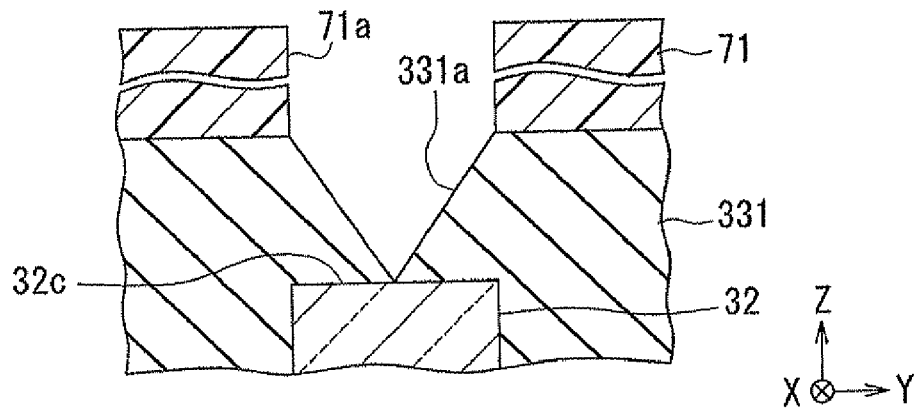

FIG. 13A to FIG. 13C show the next step. In this step, the dielectric layer 331 is etched by, for example, ion beam etching or reactive ion etching, whereby a V-shaped groove 331a is formed in the dielectric layer 331. The groove 331a is formed such that its bottom end reaches the top surface of the core 32. The groove 331a is shaped to be slightly larger than the outer shape of the plasmon generator 34 to be formed later. In this step, the groove 331a is formed such that the angle formed by each of the two inclined surfaces of the groove 331a with respect to the evanescent light generating surface 32c increases continuously with decreasing distance to the position where the medium facing surface 12a is to be formed. Next, the etching mask 71 is removed.

For example, when ion beam etching is employed to form the groove 331a, the groove 331a having the above-described shape can be formed by changing the angle that the direction of travel of the ion beam forms with respect to the direction perpendicular to the evanescent light generating surface 32c while etching the dielectric layer 331. More specifically, in such a case, as the width of the opening 71a in the etching mask 71 decreases, it becomes more difficult for the ion beam that travels at a great angle with respect to the direction perpendicular to the evanescent light generating surface 32c to pass through the opening 71a. Consequently, the angle formed by each of the two inclined surfaces of the groove 331a with respect to the evanescent light generating surface 32c increases continuously with decreasing distance to the position where the medium facing surface 12a is to be formed.

If, for example, reactive ion etching is employed to form the groove 331a, the groove 331a having the above-described shape can be formed by etching the dielectric layer 331 under the condition where the dielectric layer 331 is taper-etched. More specifically, in such a case, as the width of the opening 71a in the etching mask 71 decreases, the supply of the etching gas becomes insufficient, so that the sidewall-protecting film necessary for taper etching will not be deposited sufficiently. Consequently, the angle formed by each of the two inclined surfaces of the groove 331a with respect to the evanescent light generating surface 32c increases continuously with decreasing distance to the position where the medium facing surface 12a is to be formed.

Figure 14A:
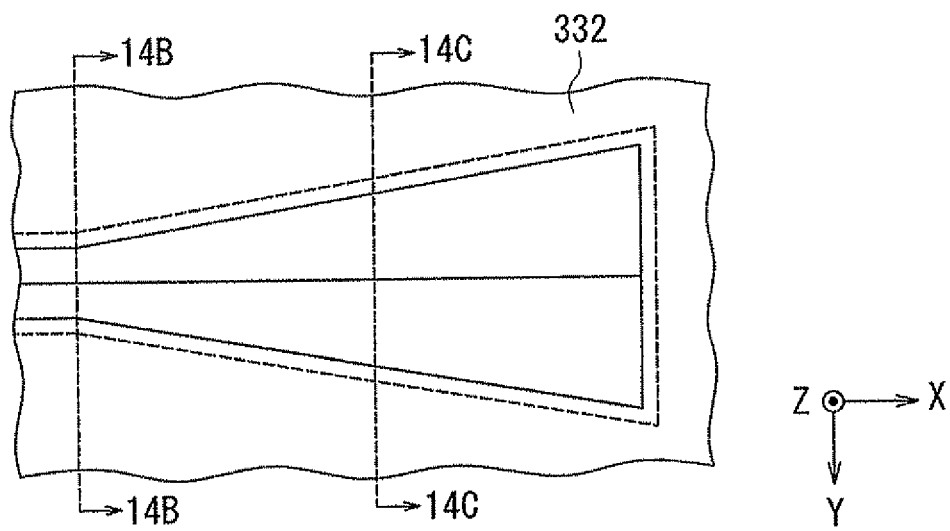
FIG. 14A to FIG. 14C are explanatory diagrams showing a step that follows the step shown in FIG. 13A to FIG. 13C.
Figure 14B:
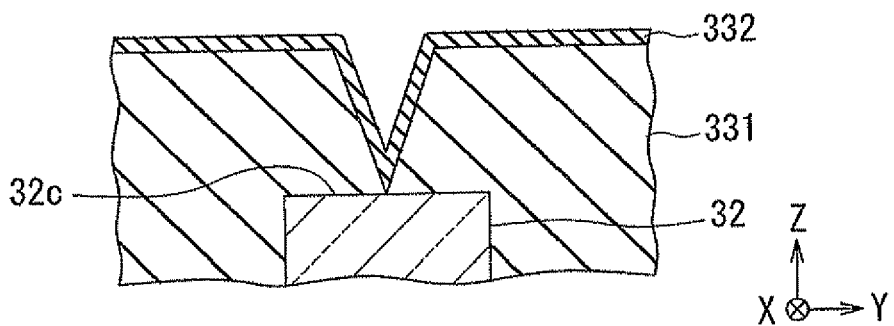
Figure 14C:
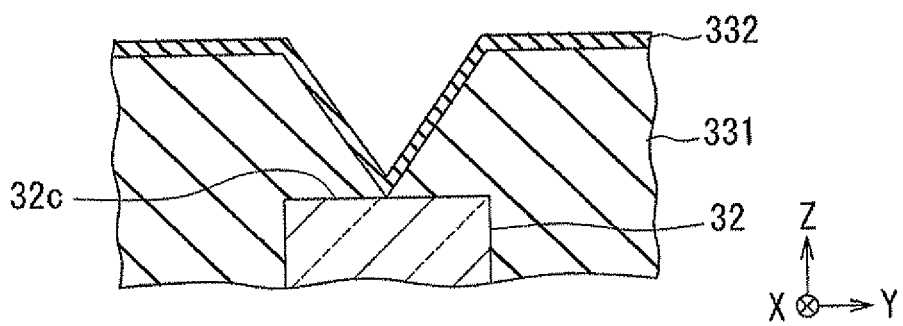

FIG. 14A to FIG. 14C show the next step. In this step, a dielectric film 332 is formed by, for example, sputtering, so as to cover the entire top surface of the stack shown in FIG. 13A to FIG. 13C. The material of the dielectric film 332 is the same as that of the clad layer 33. The dielectric film 332 is formed also in the groove 331a. The stack after the formation of the dielectric film 332 has a recess for accommodating the plasmon generator 34 to be formed later.

Figure 15A:
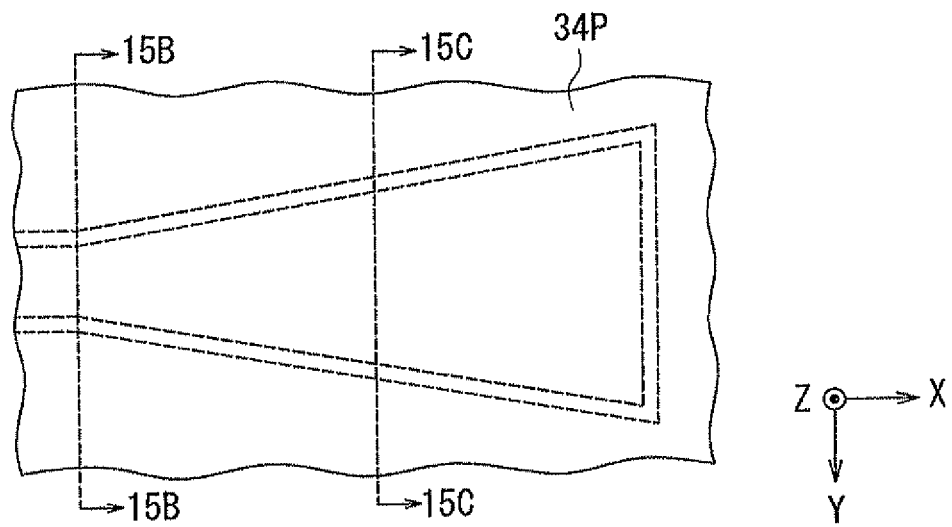
FIG. 15A to FIG. 15C are explanatory diagrams showing a step that follows the step shown in FIG. 14A to FIG. 14C.
Figure 15B:
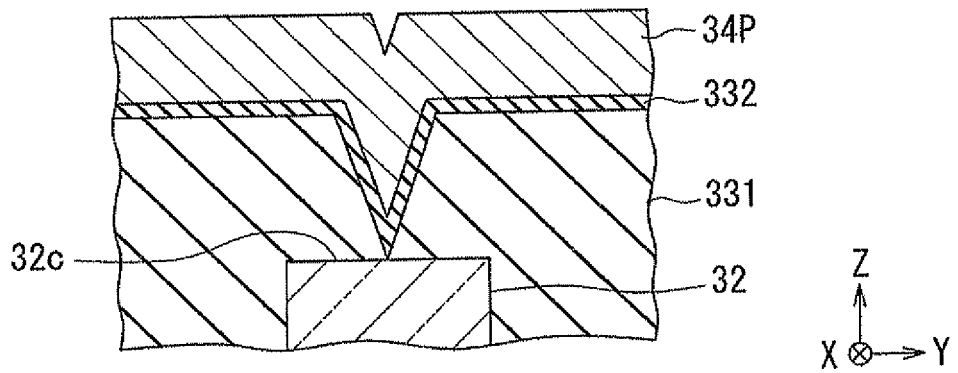
Figure 15C:
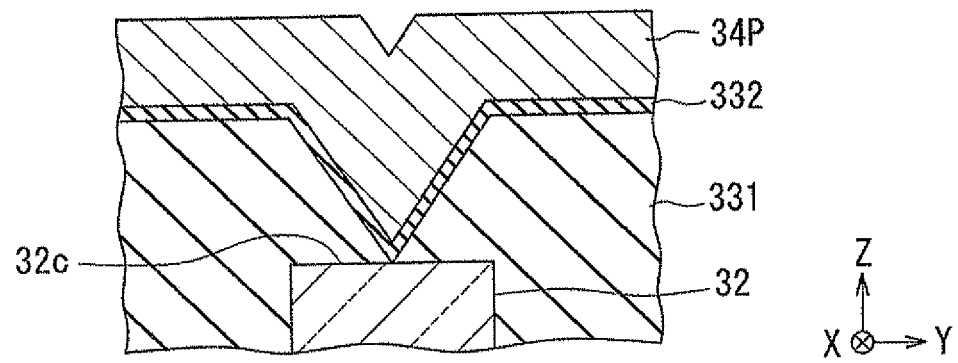

FIG. 15A to FIG. 15C show the next step. In this step, a metal film 34P, which is to become the plasmon generator 34 later, is formed over the entire top surface of the stack shown in FIG. 14A to FIG. 14C. The metal film 34P is formed into a thickness sufficient for filling the above-mentioned recess in the stack shown in FIG. 14A to FIG. 14C. Before forming the metal film 34P, an adhesion film may be formed on the dielectric film 332 for the purpose of improving the adhesion of the metal film 34P to the dielectric film 332. The adhesion film may be made of Ti or Ta, for example. The adhesion film may have a thickness of 1 nm or so.

Figure 16A:
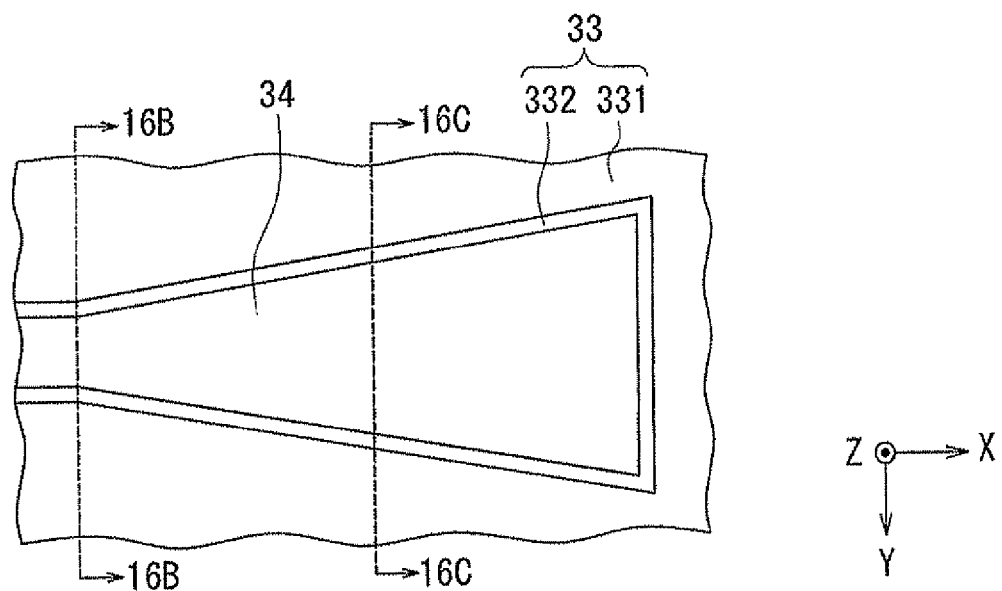
FIG. 16A to FIG. 16C are explanatory diagrams showing a step that follows the step shown in FIG. 15A to FIG. 15C.
Figure 16B:
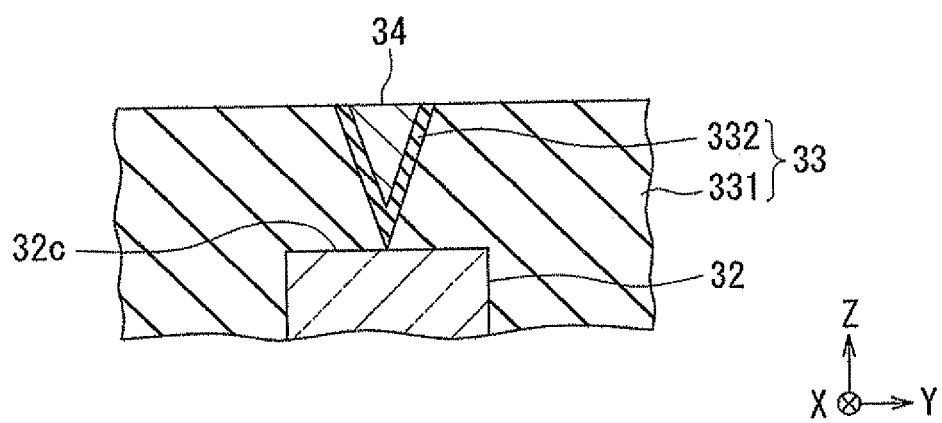
Figure 16C:
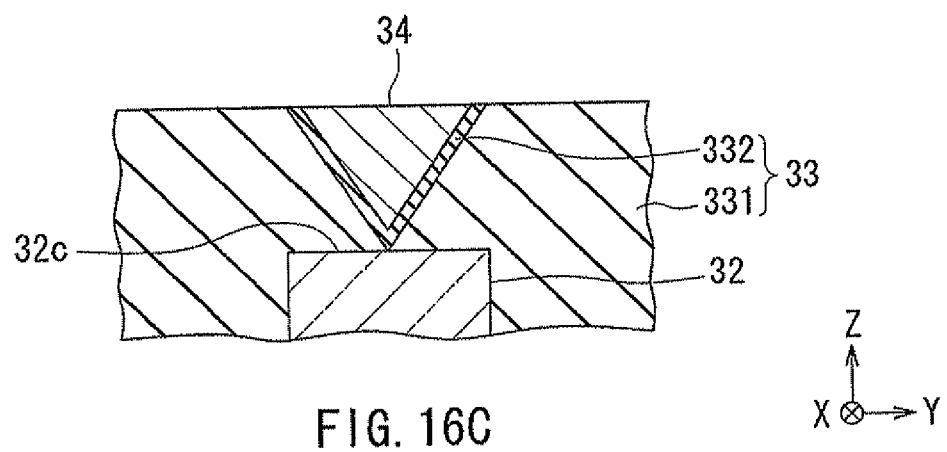

FIG. 16A to FIG. 16C show the next step. In this step, the metal film 34P is polished by, for example, chemical mechanical polishing, until the dielectric film 332 or the dielectric layer 331 is exposed. FIG. 16A to FIG. 16C show an example where the metal film 34P is polished until the dielectric layer 331 is exposed. As a result, the remaining dielectric layer 331 and dielectric film 332 constitute the clad layer 33. The dielectric film 332 forms the buffer part 33A. The metal film 34P becomes the plasmon generator 34.

When the foregoing substructure is completed, the substructure is cut near the positions where the medium facing surfaces 12a are to be formed, so that the plurality of pre-slider portions are separated from each other. Subsequently, the surfaces formed by the cutting are polished into the respective medium facing surfaces 12a.

Modification Examples

Figure 17:
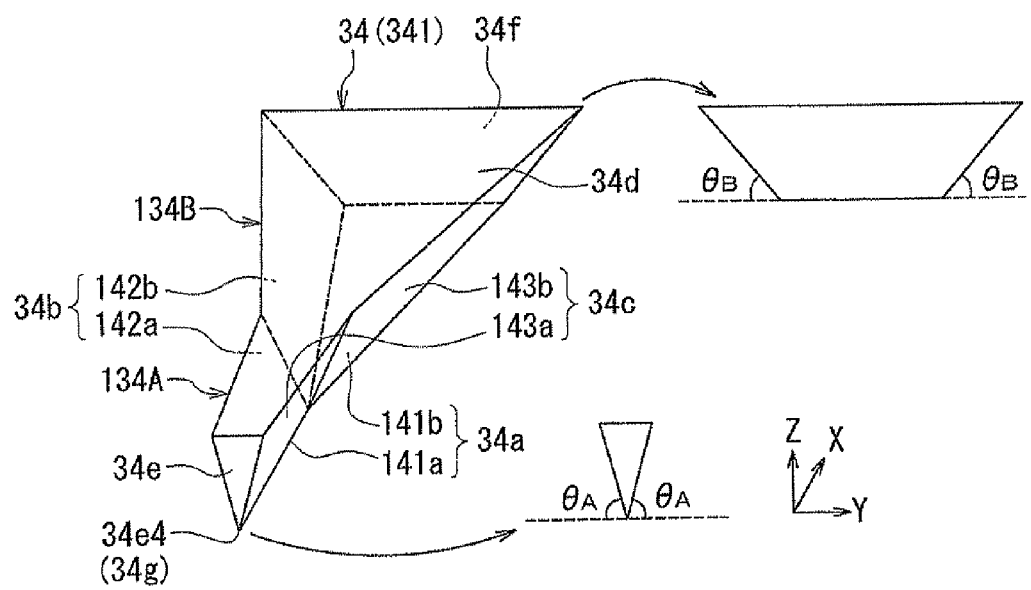
FIG. 17 is a perspective view showing a plasmon generator of a first modification example of the first embodiment of the invention.
Figure 18:
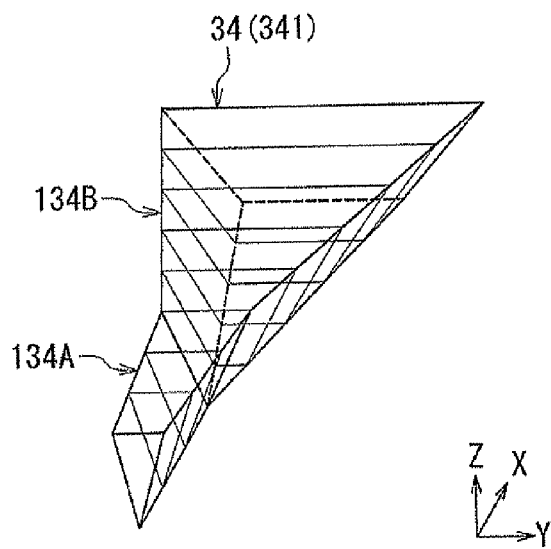
FIG. 18 is an explanatory diagram showing the shapes of a plurality of cross sections of the plasmon generator shown in FIG. 17 at respective different distances from the medium facing surface.

A first modification example of the present embodiment will now be described with reference to FIG. 17 and FIG. 18. FIG. 17 is a perspective view showing the plasmon generator of the first modification example. FIG. 18 is an explanatory diagram showing the shapes of a plurality of cross sections of the plasmon generator shown in FIG. 17 at respective different distances from the medium facing surface 12a. The plasmon generator 34 of the first modification example includes a first portion 134A that has an end face located in the medium facing surface 12a, and a second portion 134B that is located farther from the medium facing surface 12a than is the first portion 134A so as to be continuous with the first portion 134A.

The first portion 134A has the shape of a triangular prism. The cross section of the first portion 134A parallel to the medium facing surface 12a has the shape of a triangle with the vertex downward. The end of the second portion 134B at the position of the border with the first portion 134A has the same triangular shape as that of the end of the first portion 134A at the border position. In positions farther from the medium facing surface 12a than the border with the first portion 134A, the cross section of the second portion 134B parallel to the medium facing surface 12a has the shape of a trapezoid with the lower side shorter than the upper side. Both the upper and lower sides of this cross section of the second portion 134B continuously become greater as the position of the cross section gets farther from the medium facing surface 12a.

In the first modification example, the plasmon exciting part 34a includes a propagation edge 141a that is included in the first portion 134A and a flat surface part 141b that is included in the second portion 134B. The flat surface part 141b includes a width changing portion. The width changing portion has a width that decreases with decreasing distance to the medium facing surface 12a, the width being in the direction parallel to the medium facing surface 12a and the evanescent light generating surface 32c (the Y direction). In the example shown in FIG. 17 and FIG. 18, the entire flat surface part 141b is composed of the width changing portion. The flat surface part 141b (the width changing portion) has two sides that are opposite in the direction of the width (the Y direction). The angle that one of the two sides forms with respect to the direction perpendicular to the medium facing surface 12a (the X direction) is equal to the angle that the other of the two sides forms with respect to the direction perpendicular to the medium facing surface 12a (the X direction). This angle preferably falls within the range of 3 to 50 degrees, and more preferably within the range of 10 to 25 degrees.

The flat surface part 141b (the width changing portion) has a front end part that is closer to the medium facing surface 12a. The front end part is located at a distance from the medium facing surface 12a. The propagation edge 141a connects the front end part of the flat surface part 141b (the width changing portion) to the near-field light generating part 34g. The propagation edge 141a propagates plasmons. The near-field light generating part 34g lies at an end of the propagation edge 141a. In a cross section parallel to the medium facing surface 12a, the propagation edge 141a may have the shape of a perfectly pointed edge whereas it may have an arc shape in a microscopic view.

In the first modification example, the first inclined surface 34b includes an inclined surface 142a that is included in the first portion 134A and an inclined surface 142b that is included in the second portion 134B. The second inclined surface 34c includes an inclined surface 143a that is included in the first portion 134A and an inclined surface 143b that is included in the second portion 134B.

The inclined surfaces 142a and 143a are formed by the surfaces of the first portion 134A that lie on opposite sides in the direction parallel to the medium facing surface 12a and the evanescent light generating surface 32c (the Y direction). The propagation edge 141a is formed by the inclined surfaces 142a and 143a meeting each other.

The inclined surfaces 142b and 143b are formed by the surfaces of the second portion 134B that lie on opposite sides in the direction parallel to the medium facing surface 12a and the evanescent light generating surface 32c (the Y direction). The flat surface part 141b connects respective ends of the inclined surfaces 142b and 143b to each other, the respective ends being closer to the evanescent light generating surface 32c.

The plasmon generator 34 of the first modification example includes a shape changing portion 341 where the angle of inclination of each of the first and second inclined surfaces 34b and 34c with respect to the evanescent light generating surface 32c increases continuously with decreasing distance to the medium facing surface 12a. At least a part of the propagation edge 141a and at least a part of the flat surface part 141b (the width changing portion) lie in the shape changing portion 341. In the example shown in FIG. 17 and FIG. 18, the entire plasmon generator 34 is composed of the shape changing portion 341. Specifically, the angle of inclination of each of the inclined surfaces 142b and 143b with respect to the evanescent light generating surface 32c and the angle of inclination of each of the inclined surfaces 142a and 143a with respect to the evanescent light generating surface 32c both continuously increase with decreasing distance to the medium facing surface 12a.

As shown in FIG. 17, the angle of inclination of each of the first and second inclined surfaces 34b and 34c with respect to the evanescent light generating surface 32c at the end of the shape changing portion 341 of the plasmon generator 34 closest to the medium facing surface 12a, i.e., at the front end face 34e, will be represented by $\theta_A$. On the other hand, the angle of inclination of each of the first and second inclined surfaces 34b and 34c with respect to the evanescent light generating surface 32c at the end of the shape changing portion 341 farthest from the medium facing surface 12a, i.e., at the rear end face 34f, will be represented by $\theta_B$. $\theta_A$ is greater than $\theta_B$. As shown in FIG. 18, in any cross section of the shape changing portion 341 parallel to the medium facing surface 12a, the angle of inclination of each of the first and second inclined surfaces 34b and 34c with respect to the evanescent light generating surface 32c falls between $\theta_A$ and $\theta_B$ inclusive, and continuously increases as the position of the cross section gets closer to the medium facing surface 12a.

In the first modification example, surface plasmons are excited on the flat surface part 141b and the propagation edge 141a of the plasmon exciting part 34a through coupling with evanescent light that occurs from the evanescent light generating surface 32c. According to the first modification example, the inclusion of the flat surface part 141b in the plasmon exciting part 34a makes it possible to excite more surface plasmons on the plasmon exciting part 34a. The width of the flat surface part 141b (the width changing portion) in the direction parallel to the medium facing surface 12a and the evanescent light generating surface 32c (the Y direction) decreases with decreasing distance to the medium facing surface 12a. The surface plasmons excited on the flat surface part 141b are gradually transformed into edge plasmons, which are surface plasmons to propagate along the two sides of the flat surface part 141b that are opposite in the direction of the width (the Y direction), while propagating over the flat surface part 141b. The surface plasmons (including edge plasmons) propagating over the flat surface part 141b reach the propagation edge 141a, and are transformed into edge plasmons to be propagated along the propagation edge 141a. The propagation edge 141a propagates the edge plasmons that are based on the surface plasmons excited on the flat surface 141b, and the edge plasmons that are excited on the propagation edge 141a. Those edge plasmons are propagated along the propagation edge 141a to the near-field light generating part 34g.

In the flat surface part 141b (the width changing portion), the propagating plasmons increase in electric field intensity. This is presumably based on the following first and second principles. Initially, a description will be given of the first principle. The wave number of the surface plasmons propagating over the flat surface part 141b increases as the width of the flat surface part 141b decreases. As the wave number of the surface plasmons increases, the speed of travel of the surface plasmons decreases. This consequently increases the energy density of the surface plasmons and enhances the electric field intensity of the surface plasmons.

Next, a description will be given of the second principle. When the surface plasmons propagate over the flat surface part 141b, some of the surface plasmons impinge on the two sides of the flat surface part 141b that are opposite in the direction of the width (the Y direction) to scatter, thereby generating a plurality of plasmons with different wave numbers. Some of the plurality of plasmons thus generated are transformed into edge plasmons which have a wave number higher than that of the surface plasmons propagating over the flat surface. In this way, the surface plasmons are gradually transformed into the edge plasmons to propagate along the two sides, whereby the edge plasmons gradually increase in electric field intensity. As compared with the surface plasmons propagating over the flat surface, the edge plasmons are higher in wave number and lower in speed of travel. Consequently, the transformation of the surface plasmons into the edge plasmons increases the energy density of the plasmons. In the flat surface part 141b, the foregoing transformation of the surface plasmons into the edge plasmons is accompanied by the generation of new surface plasmons based on the evanescent light occurring from the evanescent light generating surface 32c. The new surface plasmons are also transformed into edge plasmons. As a result, the edge plasmons increase in electric field intensity. Those edge plasmons are transformed into edge plasmons that propagate over the propagation edge 141a. This generates the edge plasmons of enhanced electric field intensity as compared with the surface plasmons originally generated.

In the flat surface part 141b (the width changing portion), the surface plasmons propagating over the flat surface and the edge plasmons having a wave number higher than that of the surface plasmons coexist. It can be considered that both the surface plasmons and the edge plasmons increase in electric field intensity in the flat surface part 141b based on the first and second principles described above. In the flat surface part 141b, the electric field intensity of the plasmons can thus be enhanced as compared with a case where either one of the first principle and the second principle is in operation.

Figure 19:
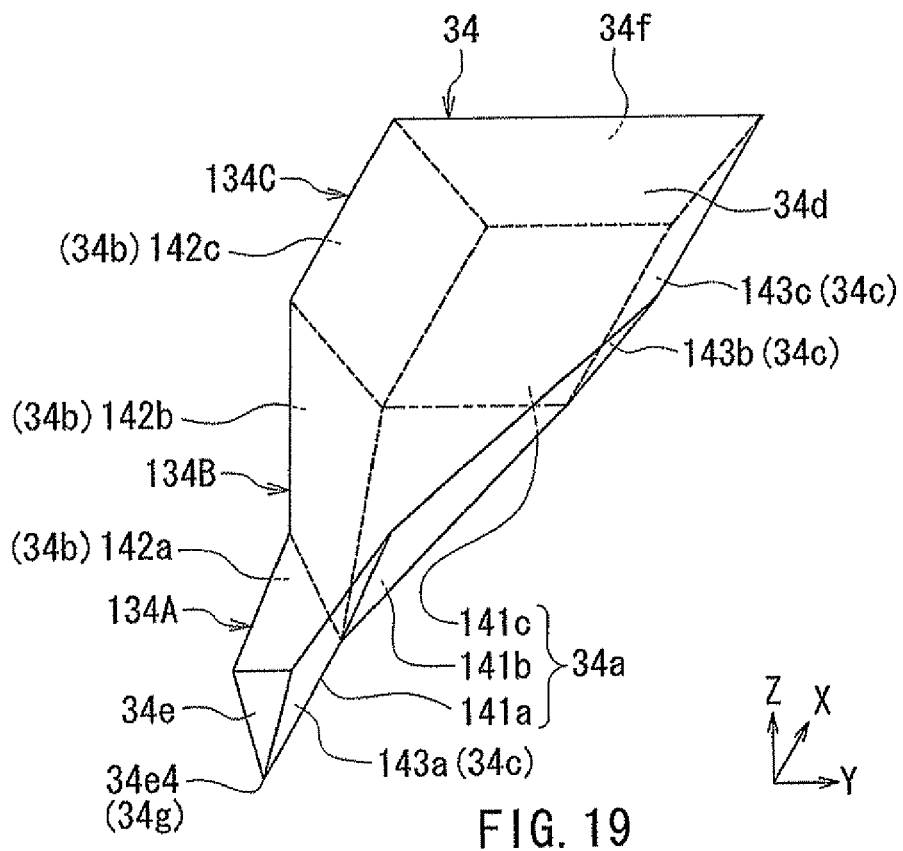
FIG. 19 is a perspective view showing a plasmon generator of a second modification example of the first embodiment of the invention.
Figure 20:
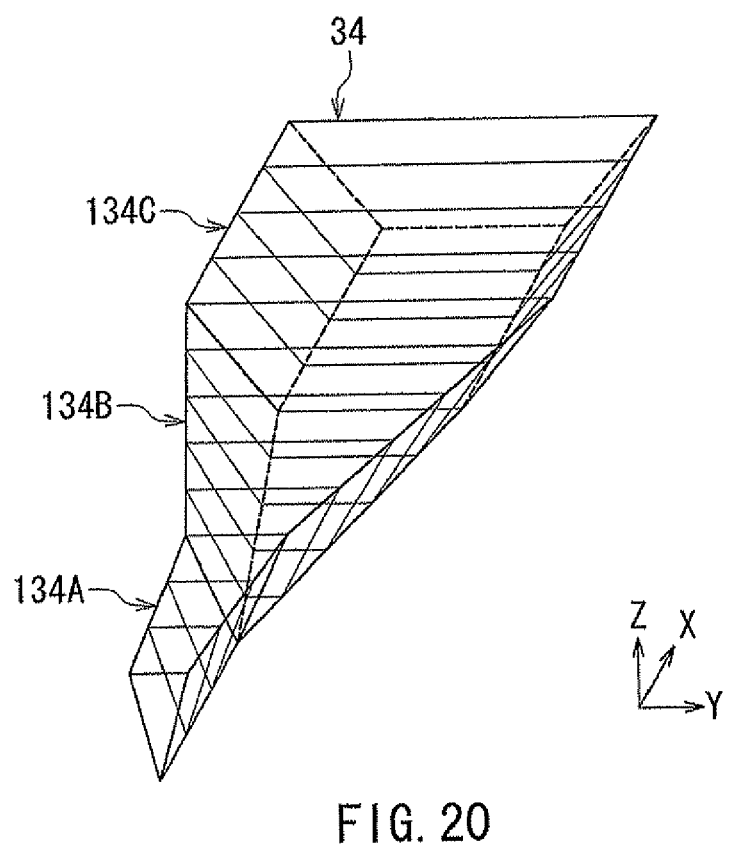
FIG. 20 is an explanatory diagram showing the shapes of a plurality of cross sections of the plasmon generator shown in FIG. 19 at respective different distances from the medium facing surface.

A second modification example of the present embodiment will now be described with reference to FIG. 19 and FIG. 20. FIG. 19 is a perspective view showing the plasmon generator of the second modification example. FIG. 20 is an explanatory diagram showing the shapes of a plurality of cross sections of the plasmon generator shown in FIG. 19 at respective different distances from the medium facing surface. The plasmon generator 34 of the second modification example includes a third portion 134C in addition to the first portion 134A and the second portion 134B of the first modification example. The third portion 134C is located farther from the medium facing surface 12a than is the second portion 134B so as to be continuous with the second portion 134B. In FIG. 19, the border between the second portion 134B and the third portion 134C is shown by a chain double-dashed line.

The end of the third portion 134C at the position of the border between the second portion 134B and the third portion 134C has the same trapezoidal shape as that of the end of the second portion 134B at the border position. The cross section of the third portion 134C parallel to the medium facing surface 12a has a constant shape regardless of the distance from the medium facing surface 12a, and the shape coincides with that of the end of the third portion 134C in the border position mentioned above.

In the second modification example, the plasmon exciting part 34a includes a propagation edge 141a that is included in the first portion 134A, a flat surface part 141b that is included in the second portion 134B, and a flat surface part 141c that is included in the third portion 134C. The flat surface part 141c has a constant width in the direction parallel to the medium facing surface 12a and the evanescent light generating surface 32c (the Y direction) regardless of the distance from the medium facing surface 12a.

In the second modification example, the first inclined surface 34b includes an inclined surface 142a that is included in the first portion 134A, an inclined surface 142b that is included in the second portion 134B, and an inclined surface 142c that is included in the third portion 134C. The second inclined surface 34c includes an inclined surface 143a that is included in the first portion 134A, an inclined surface 143b that is included in the second portion 134B, and an inclined surface 143c that is included in the third portion 134C.

Each of the inclined surfaces 142c and 143c included in the third portion 134C forms a constant angle of inclination with respect to the evanescent light generating surface 32c regardless of the distance from the medium facing surface 12a. In the second modification example, the first portion 134A and the second portion 134B therefore correspond to the shape changing portion of the present invention. The remainder of configuration of the plasmon generator 34 of the second modification example is the same as that of the plasmon generator 34 of the first modification example.

In the second modification example, surface plasmons are excited on the flat surface parts 141b and 141c and the propagation edge 141a of the plasmon exciting part 34a through coupling with the evanescent light generated from the evanescent light generating surface 32c. According to the second modification example, the inclusion of the flat surface parts 141b and 141c in the plasmon exciting part 34a allows excitation of more surface plasmons on the plasmon exciting part 34a.

A description will now be given of the effect resulting from the configuration that the plasmon exciting part 34a includes the flat surface part 141c having a constant width in the Y direction. Assume a plasmon generator 34 of the same length in the direction perpendicular to the medium facing surface 12a (the X direction). If the plasmon exciting part 34a does not include the flat surface part 141c and the flat surface part 141b extends up to the end of the plasmon exciting part 34a opposite from the medium facing surface 12a, the plasmon exciting part 34a has a maximum width greater than in the case where the plasmon exciting part 34a includes the flat surface part 141c. If so, the width $W_{WG}$ of the core 32 in the vicinity of the plasmon generator 34 needs to be increased to the maximum width of the plasmon exciting part 34a. This makes it likely for at least a part of the core 32 in the vicinity of the plasmon generator 34 to enter multi mode that is capable of propagating a plurality of modes (propagation modes) of light. In such a case, the mode that contributes to the excitation of surface plasmons on the plasmon exciting part 34a decreases to cause a drop in the use efficiency of the light that is propagated through the core 32. On the other hand, if the plasmon exciting part 34a includes the flat surface part 141c, the width $W_{WG}$ of the core 32 in the vicinity of the plasmon generator 34 can be made smaller than in the case where the plasmon exciting part 34a does not include the flat surface part 141c. Consequently, it is possible to bring at least a part of the core 32 in the vicinity of the plasmon generator 34 into single mode that is capable of propagating only a single mode of light. This makes it possible to improve the use efficiency of the laser light that is propagated through the core 32. The remainder of the function and effects of the plasmon generator 34 of the second modification example are the same as those of the plasmon generator 34 of the first modification example.

The effects of the heat-assisted magnetic recording head 1 according to the present embodiment will now be described.

The plasmon generator 34 of the present embodiment has the outer surface including the plasmon exciting part 34a, and has the near-field light generating part 34g located in the medium facing surface 12a. The plasmon exciting part 34a faces the evanescent light generating surface 32c of the core 32 with a predetermined distance therebetween. Surface plasmons are excited on the plasmon exciting part 34a through coupling with the evanescent light that occurs from the evanescent light generating surface 32c. The near-field light generating part 34g generates near-field light based on the surface plasmons excited on the plasmon exciting part 34a.

According to the present embodiment, it is possible to transform the laser light that is propagated through the core 32 into near-field light with higher efficiency, as compared with the conventional technique of irradiating a plasmon antenna directly with laser light to produce near-field light from the plasmon antenna. Consequently, according to the present embodiment, it is possible to efficiently use the laser light that is propagated through the core 32, and to generate intense near-field light from the plasmon generator 34. The present embodiment also makes it possible to prevent a part of the medium facing surface 12a from protruding due to transformation of the energy of the laser light into thermal energy in the heat-assisted magnetic recording head.

The outer surface of the plasmon generator 34 includes the first inclined surface 34b and the second inclined surface 34c that are each connected to the plasmon exciting part 34a. The first and second inclined surfaces 34b and 34c increase in distance from each other with increasing distance from the plasmon exciting part 34a. The plasmon generator 34 includes the shape changing portion 341 where the angle of inclination of each of the first and second inclined surfaces 34b and 34c with respect to the evanescent light generating surface 32c increases continuously with decreasing distance to the medium facing surface 12a. Consequently, according to the present embodiment, it is possible to efficiently use the laser light that is propagated through the core 32, and to generate near-field light of small spot diameter from the plasmon generator 34. The reason for this will now be described in detail with reference to the results of simulations.

To clarify the problem to be solved by the present invention, a description will initially be given of a first simulation that was performed on a model including a plasmon generator of a comparative example. The plasmon generator of the comparative example has the shape of a triangular prism and has an outer surface as described below. The outer surface of the plasmon generator of the comparative example includes a propagation edge, a first inclined surface, a second inclined surface, and a top surface. The propagation edge faces the evanescent light generating surface 32c with a predetermined distance therebetween. The first and second inclined surfaces are each connected to the propagation edge. The first and second inclined surfaces increase in distance from each other with increasing distance from the propagation edge. The top surface connects the respective top ends of the first and second inclined surfaces to each other. In the plasmon generator of the comparative example, each of the first and second inclined surfaces forms a constant angle of inclination with respect to the evanescent light generating surface 32c regardless of the distance from the medium facing surface 12a.

In the first simulation, tantalum oxide was selected as the material of the core 32, alumina was selected as the material of the clad, and Ag was selected as the material of the plasmon generator 34. The core 32 was 0.4 both in width $W_{WG}$ and thickness Two in the vicinity of the plasmon generator 34. The distance between the propagation edge and the evanescent light generating surface 32c was 35 nm. The length of the plasmon generator in the X direction was 1.6 μm. A Gaussian beam with a wavelength of 800 nm was selected as the laser light to be propagated through the core 32.

In the first simulation, the light density distribution of the near-field light at the surface of a magnetic recording medium 201 located 6 nm away from the medium facing surface 12a was determined by using a three-dimensional finite-difference time-domain method (FDTD method). From the light density distribution, the spot diameter of the near-field light (hereinafter, referred to as light spot diameter) and the maximum light density were determined. The light spot diameter was defined as the full width at half maximum in the light density distribution.

Figure 21:
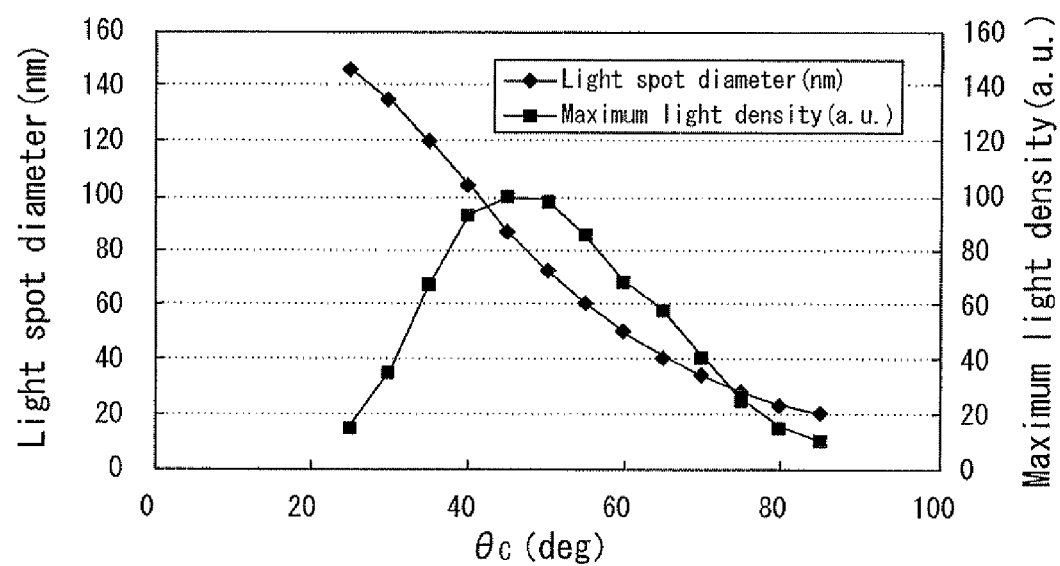
FIG. 21 is a characteristic chart showing the result of a first simulation that was performed using a model including a plasmon generator of a comparative example.

In the first simulation, the angle of inclination $\theta_C$ of each of the first and second inclined surfaces of the plasmon generator with respect to the evanescent light generating surface 32c was changed in the range of 25° to 85° in units of 5° to determine the relationship of $\theta_C$ with the light spot diameter and the maximum light density. Table 1 and FIG. 21 show the result of the first simulation. In Table 1 and FIG. 21, the maximum light density is in arbitrary unit (a.u.). The maximum light density in Table 1 and FIG. 21 was determined by dividing the actual maximum densities at respective $\theta_C$ values by the actual maximum light density at $\theta_C=45°$, multiplied by 100.

TABLE 1

| θc (deg) | Light spot diameter (nm) | Maximum light density (a.u.) |
|---|---|---|
| 85 | 20 | 10 |
| 80 | 23 | 15 |
| 75 | 28 | 25 |
| 70 | 34 | 41 |
| 65 | 41 | 58 |
| 60 | 50 | 69 |
| 55 | 61 | 86 |
| 50 | 73 | 98 |
| 45 | 87 | 100 |
| 40 | 104 | 93 |
| 35 | 120 | 67 |
| 30 | 135 | 35 |
| 25 | 146 | 15 |

From Table 1 and FIG. 21, it is shown that the light spot diameter decreases with increasing $\theta_C$. It is also shown that the maximum light density peaks at around $\theta_C=45°$, and falls off away from $\theta_C=45°$. In general, a recording density as high as 1 Tbpsi (bpsi: bits per square inch) requires a linear recording density of around 500 kTPI (TPI: track per inch). For that purpose, the magnetic write width (hereinafter, referred to as MWW) needs to be approximately 50 nm or less. In heat-assisted magnetic recording, the light spot diameter is closely related to MWW. For recording densities as high as or higher than 1 Tbpsi, the light spot diameter needs to be 50 nm or less. When using the plasmon generator of the comparative example, $\theta_C$ needs to be 60° or greater in order to reduce the light spot diameter to or below 50 nm. As shown in FIG. 21, however, the plasmon generator of the comparative example significantly drops in the maximum light density at $\theta_C=60°$ and above. When using the plasmon generator of the comparative example, it is therefore difficult to generate near-field light that has heating power necessary for heat-assisted magnetic recording while reducing MWW so as to achieve a recording density as high as or higher than 1 Tbpsi.

A description will now be given of a second simulation that was performed on a model including the plasmon generator 34 shown in FIG. 2, and a third simulation that was performed on a model including the plasmon generator 34 shown in FIG.

17. In the second and third simulations, the plasmon generator 34 had a length of 1.6 μm in the X direction. In the second and third simulations, the angles of inclination $\theta_A$ and $\theta_B$ shown in FIG. 2 and FIG. 17 were changed to determine the relationship between the combination of $\theta_A$ and $\theta_B$ and the maximum light density. The rest of the conditions in the second and third simulations were the same as those in the first simulation. While $\theta_A$ is greater than $\theta_B$ in the plasmon generator 34 of the present embodiment, the second and third simulations were conducted to determine the maximum light density also at combinations of $\theta_A$ and $\theta_B$ where $\theta_A$ is smaller than or equal to $\theta_B$. The relationship between $\theta_A$ and the light spot diameter of the plasmon generators 34 shown in FIG. 2 and FIG. 17 is the same as that between $\theta_C$ and the light spot diameter shown in Table 1 and FIG. 21.

Figure 25:
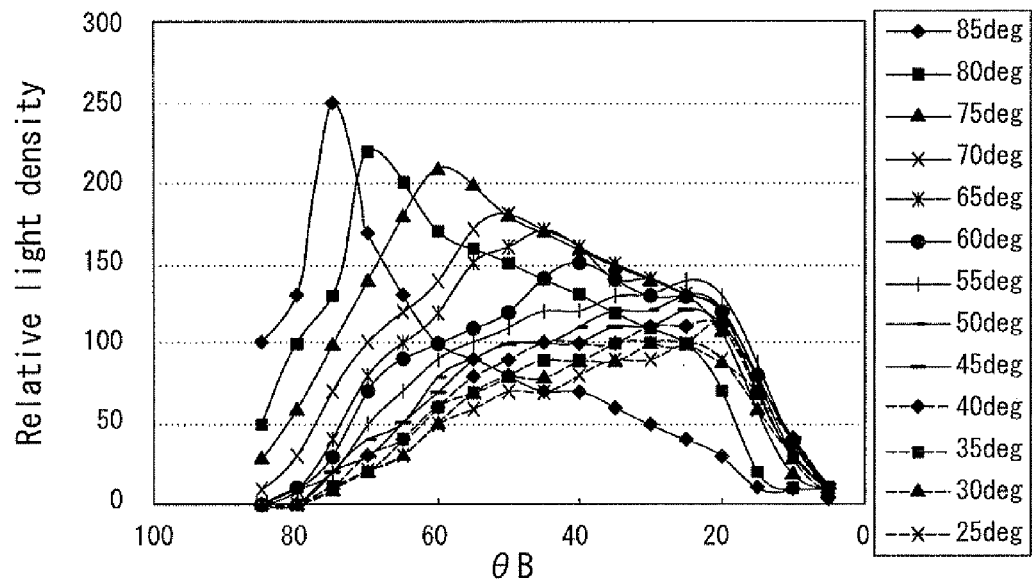
FIG. 25 is a characteristic chart showing the result of the second simulation.
Figure 26:
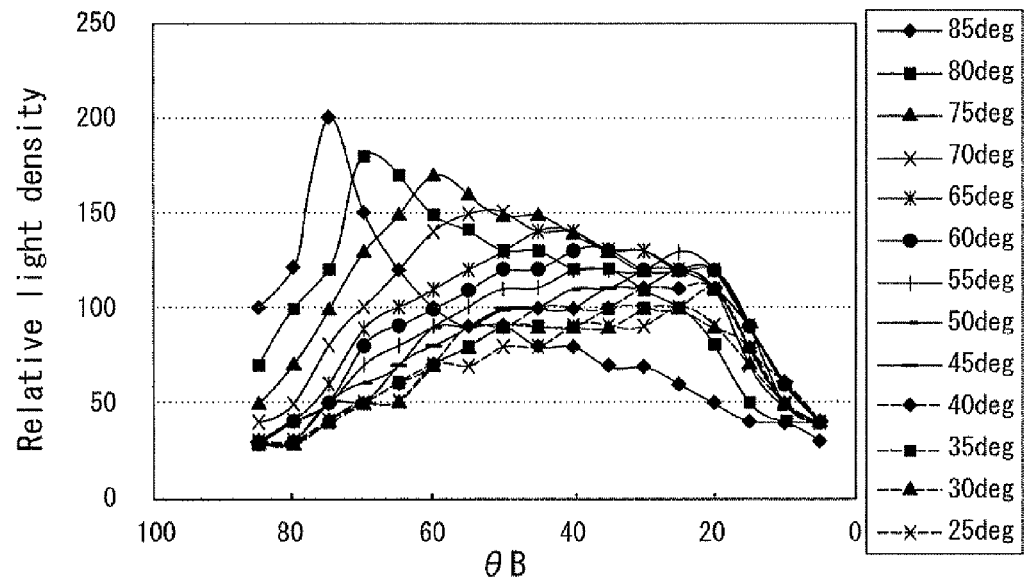
FIG. 26 is a characteristic chart showing the result of the third simulation.

FIG. 22 and FIG. 25 show the result of the second simulation. FIG. 23 and FIG. 26 show the result of the third simulation. In FIGS. 22, 23, 25 and 26, the maximum light density at each combination of $\theta_A$ and $\theta_B$ is expressed in a relative value (hereinafter, referred to as a relative light density) assuming the maximum light density at $\theta_A=\theta_B$ as 100.

In FIG. 22 and FIG. 23, the range of combinations where the relative light density exceeds 100 is enclosed with a thick line. In such a range, the maximum light density is higher by 10% or more than when $\theta_A$ is equal to $\theta_B$. In FIG. 22 and FIG. 23, the range where the relative light density exceeds 100 occupies most of the range where $\theta_B$ is greater than or equal to 20 degrees and $\theta_A$ is greater than $\theta_B$. This shows that making $\theta_A$ greater than $\theta_B$ can basically reduce the light spot diameter and increase the maximum light density as well.

The results of the second and third simulations can be quantitatively understood as follows. The smaller the angle of inclination of each of the first and second inclined surfaces of the plasmon generator 34 with respect to the evanescent light generating surface 32c, the greater the areas of portions of the first and second inclined surfaces on which surface plasmons are to be excited through coupling with evanescent light occurring from the evanescent light generating surface 32c, the portions lying within a certain distance from the evanescent light generating surface 32c. Therefore, the smaller the angle of inclination of each of the first and second inclined surfaces with respect to the evanescent light generating surface 32c, the more surfaces plasmons are considered to be excited on the plasmon exciting part and its vicinity in the plasmon generator 34. Consequently, it is considered to be possible to reduce the light spot diameter and increase surface plasmons to be excited on the plasmon generator 34 at positions away from the medium facing surface 12a for the sake of increased maximum light density by making $\theta_A$ greater than $\theta_B$, or equivalently, by continuously increasing the angle of inclination of each of the first and second inclined surfaces with respect to the evanescent light generating surface 32c with decreasing distance to the medium facing surface 12a.

As shown in FIG. 22 and FIG. 23, in the range of combinations where $\theta_B$ is smaller than 20 degrees, the maximum light density is lower than when $\theta_A$ is equal to $\theta_B$. The reason for this is considered to be that, if $\theta_B$ is too small, the portions of the first and second inclined surfaces on which surface plasmons are to be excited, the portions lying within a certain distance from the evanescent light generating surface 32c, are so large in area that it is difficult to concentrate the surface plasmons at the plasmon exciting part.

Suppose that each of the first and second inclined surfaces forms an angle of inclination θ with respect to the evanescent light generating surface 32c at an arbitrary position at any distance from the medium surface 12a. At the foregoing arbitrary position, the Y-direction width of the portions of the first and second inclined surfaces on which surface plasmons are to be excited, the portions lying within a certain distance from the evanescent light generating surface 32c, depends on cos θ. This suggests that in the range where cos $\theta_B$ is higher than $\theta_A$, or equivalently, cos $\theta_A$/cos $\theta_B$ is smaller than 1, it is basically possible to increase surface plasmons to be excited on the plasmon exciting part and its vicinity in the plasmon generator 34 and concentrate the surface plasmons with decreasing distance to the medium facing surface 12a. Consequently, this makes it possible to reduce the light spot diameter and increase the maximum light density as well.

In view of this, the relationship between the value of cos $\theta_A$/cos $\theta_B$ and the results of the second and third simulations shown in FIG. 22 and FIG. 23 was examined. FIG. 24 shows the value of cos $\theta_A$/cos $\theta_B$ at each combination of $\theta_A$ and $\theta_B$. In FIG. 24, the range of combinations where the relative light density exceeds 100 in FIG. 22 and FIG. 23 is enclosed with a thick line. This range closely coincides with the range where $\theta_B$ is greater than or equal to 20 degrees and the value of cos $\theta_A$/cos $\theta_B$ falls between 0.2 and 0.9 inclusive. Where cos $\theta_A$/cos $\theta_B$ has a value below 0.2, the maximum light density is lower than when $\theta_A$ is equal to $\theta_B$. The reason for this is considered to be that the change of θ in the shape changing portion of the plasmon generator 34 is so sharp relative to the change in distance from the medium facing surface 12a that it is difficult to concentrate surface plasmons at the plasmon exciting part.

From the results of the second and third simulations, it can be concluded that in order to reduce the light spot diameter and increase the maximum light density as well, $\theta_A$ and $\theta_B$ preferably satisfy the condition that the value of cos $\theta_A$/cos $\theta_B$ falls within the range of 0.2 to 0.9 inclusive and $\theta_B$ is greater than or equal to 20 degrees.

As has been described, the present embodiment makes it possible to reduce the light spot diameter and increase the maximum light density as well. That is, according to the present embodiment, it is possible to efficiently use the light that is propagated through the core 32 of the waveguide, and to generate near-field light having a small spot diameter from the plasmon generator 34.

The other effects of the present embodiment will now be described. In the present embodiment, the magnetic pole 35 is in contact with the plasmon generator 34, being located at such a position that the plasmon generator 34 is interposed between the magnetic pole 35 and the core 32. According to the present embodiment, it is possible that the end face 35a of the magnetic pole 35 for generating the write magnetic field and the near-field light generating part 34g of the plasmon generator 34 for generating the near-field light can be put close to each other. This makes it possible to implement an advantageous configuration for heat-assisted magnetic recording. Moreover, according to the present embodiment, the plasmon generator 34 made of a nonmagnetic metal is disposed between the core 32 and the magnetic pole 35. The laser light propagated through the core 32 can thus be prevented from being absorbed by the magnetic pole 35. This can improve the use efficiency of the laser light propagated through the core 32.

The magnetic pole 35 is in contact with the plasmon generator 34 and also in contact with the top yoke layer 43 of high volume. Consequently, according to the present embodiment, the heat occurring from the plasmon generator 34 can be dissipated through the magnetic pole 35 and the top yoke layer 43. This can suppress an excessive rise in temperature of the plasmon generator 34, so that the front end face 34e of the plasmon generator 34 will not protrude from the medium facing surface 12a, nor will the plasmon generator 34 drop in use efficiency of the light. Moreover, according to the present embodiment, the plasmon generator 34 made of a metal is in contact with the magnetic pole 35 made of a magnetic metal material. The plasmon generator 34 is thus not electrically isolated. According to the present embodiment, it is therefore possible to avoid the occurrence of electrical static discharge (ESD) in the plasmon generator 34.

Note that the effects of the present embodiment described above also apply to the first and second modification examples.

Second Embodiment

Figure 27:
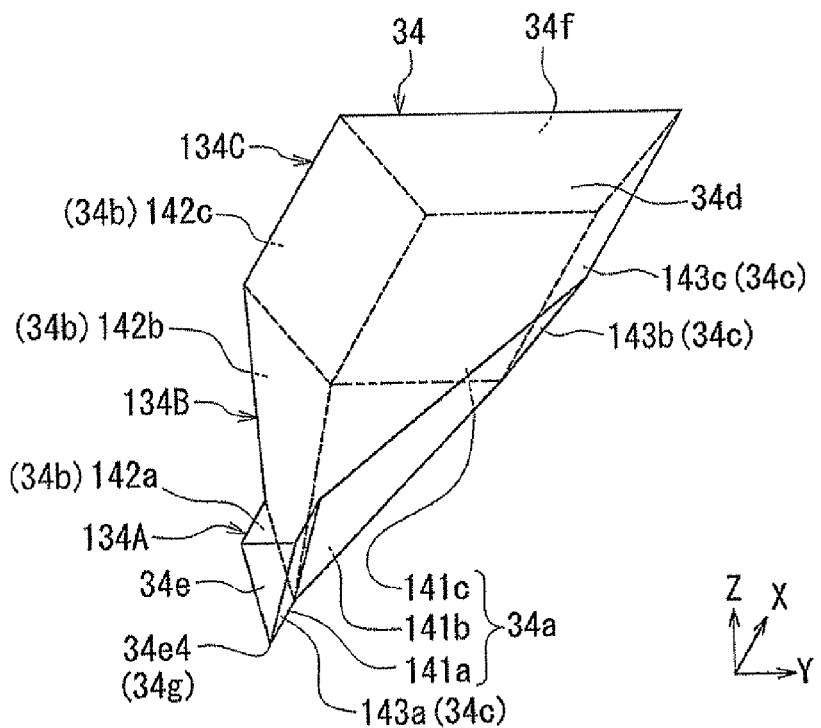
FIG. 27 is a perspective view showing a plasmon generator of a second embodiment of the invention.
Figure 28:
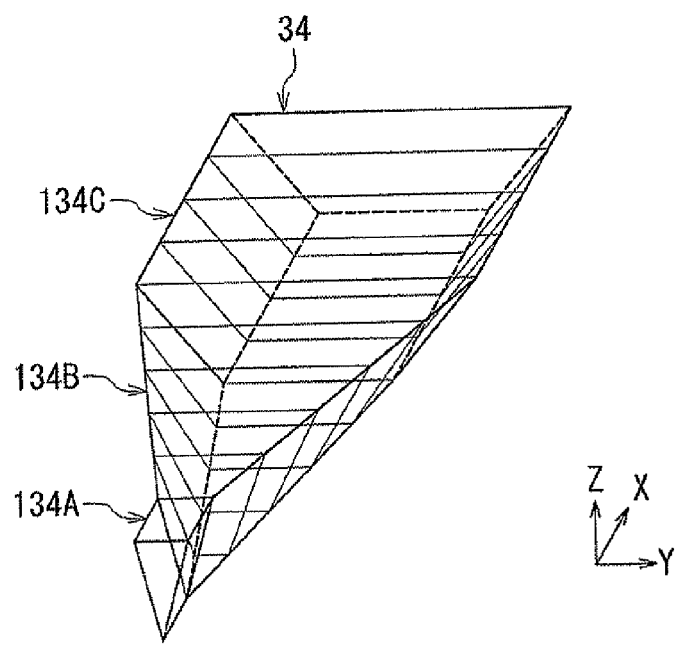
FIG. 28 is an explanatory diagram showing the shapes of a plurality of cross sections of the plasmon generator shown in FIG. 27 at respective different distances from the medium facing surface.

A second embodiment of the present invention will now be described with reference to FIG. 27 and FIG. 28. FIG. 27 is a perspective view showing the plasmon generator of the heat-assisted magnetic recording head according to the present embodiment. FIG. 28 is an explanatory diagram showing the shapes of a plurality of cross sections of the plasmon generator shown in FIG. 27 at respective different distances from the medium facing surface.

The plasmon generator 34 of the present embodiment has the first portion 134A, the second portion 134B, and the third portion 134C, as does the plasmon generator 34 of the second modification example of the first embodiment shown in FIG. 19 and FIG. 20.

In the present embodiment, each of the inclined surfaces 142a and 143a included in the first portion 134A forms a constant angle of inclination with respect to the evanescent light generating surface 32c regardless of the distance from the medium facing surface 12a. Consequently, in the present embodiment, only the second portion 134B of the plasmon generator 34 corresponds to the shape changing portion of the present invention. The angle of inclination of each of the first and second inclined surfaces 34b and 34c (inclined surfaces 142a and 143a) with respect to the evanescent light generating surface 32c in the first portion 134A is equal to that of each of the first and second inclined surfaces 34b and 34c (inclined surfaces 142b and 143b) with respect to the evanescent light generating surface 32c at the end of the shape changing portion closer to the medium facing surface 12a, i.e., at the end of the second portion 134B closer to the medium facing surface 12a. The remainder of the configuration of the plasmon generator 34 of the present embodiment is the same as that of the plasmon generator 34 of the second modification example of the first embodiment.

A description will now be given of the effect resulting from the configuration that each of the inclined surfaces 142a and 143a included in the first portion 134A forms a constant angle of inclination with respect to the evanescent light generating surface 32c regardless of the distance from the medium facing surface 12a in the present embodiment. As has been described in the first embodiment, the medium facing surface 12a is formed by polishing the surface that is formed by cutting the substructure. This may produce some variations in the position of the medium facing surface 12a. In the present embodiment, the shape of the front end face 34e of the plasmon generator 34 can be kept unchanged even if the position of the medium facing surface 12a somewhat varies. According to the present embodiment, it is therefore possible to prevent the near-field light generated by the plasmon generator 34 from varying in characteristic due to variations in the position of the medium facing surface 12a.

The remainder of configuration, function and effects of the present embodiment are similar to those of the second modification example of the first embodiment.

Third Embodiment

Figure 29:
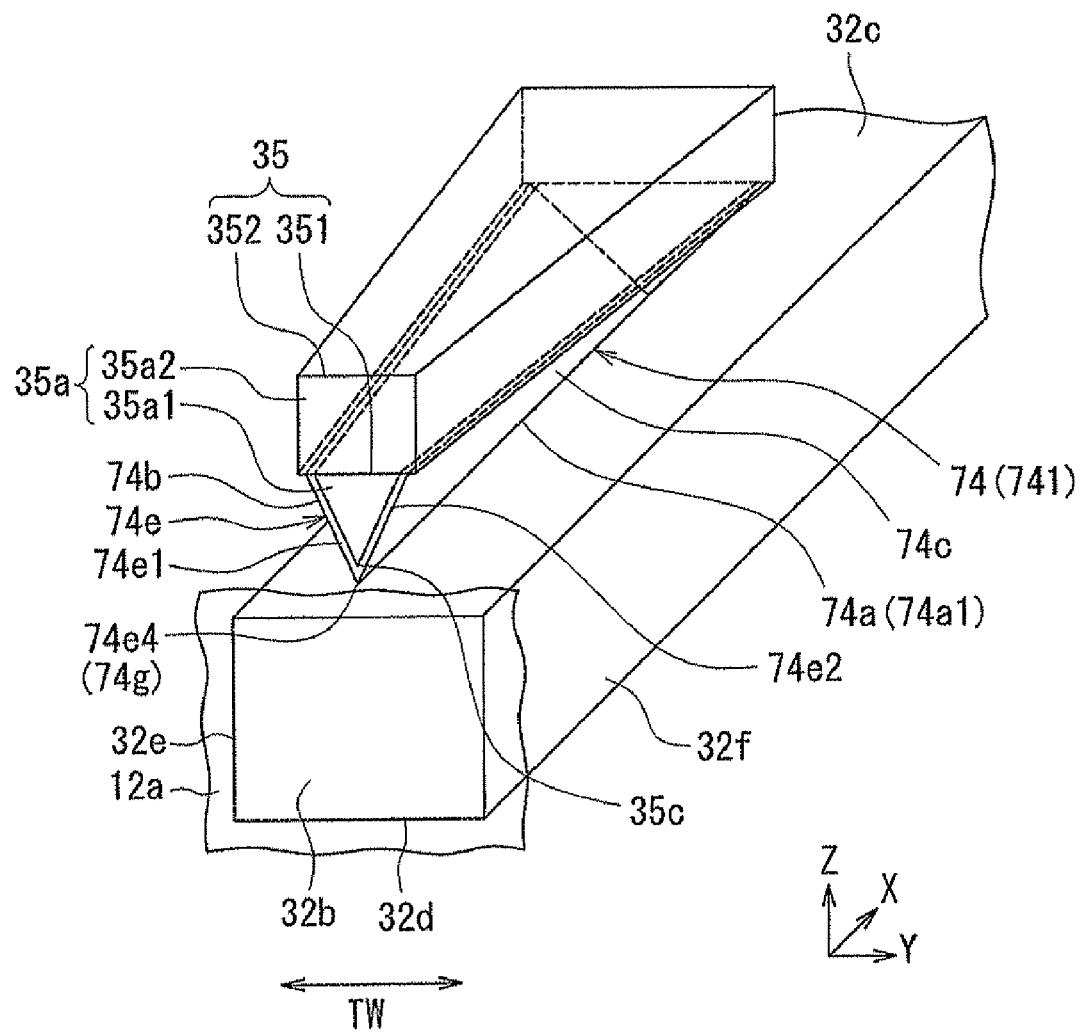
FIG. 29 is a perspective view showing a waveguide's core, a plasmon generator, and a magnetic pole of a heat-assisted magnetic recording head according to a third embodiment of the invention.
Figure 30:
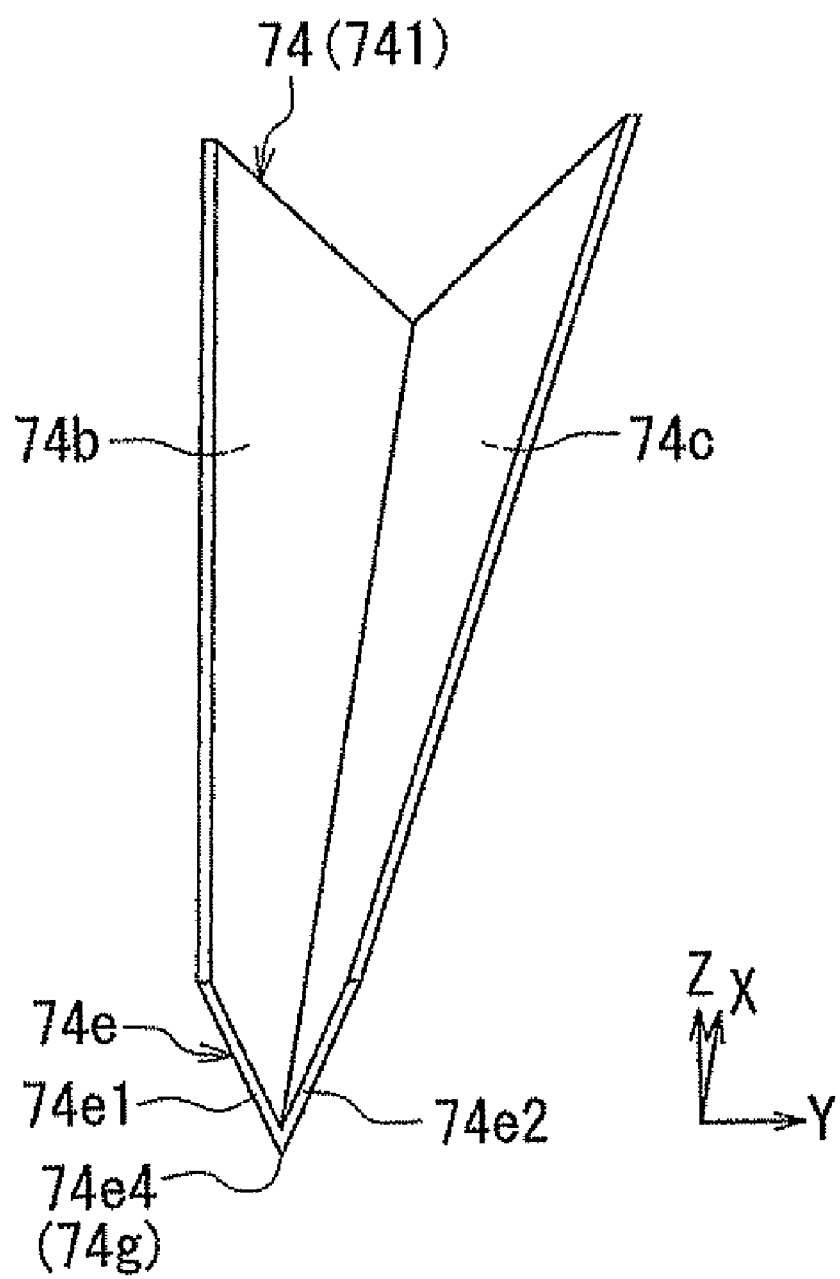
FIG. 30 is a perspective view showing the plasmon generator of FIG. 29.
Figure 31:
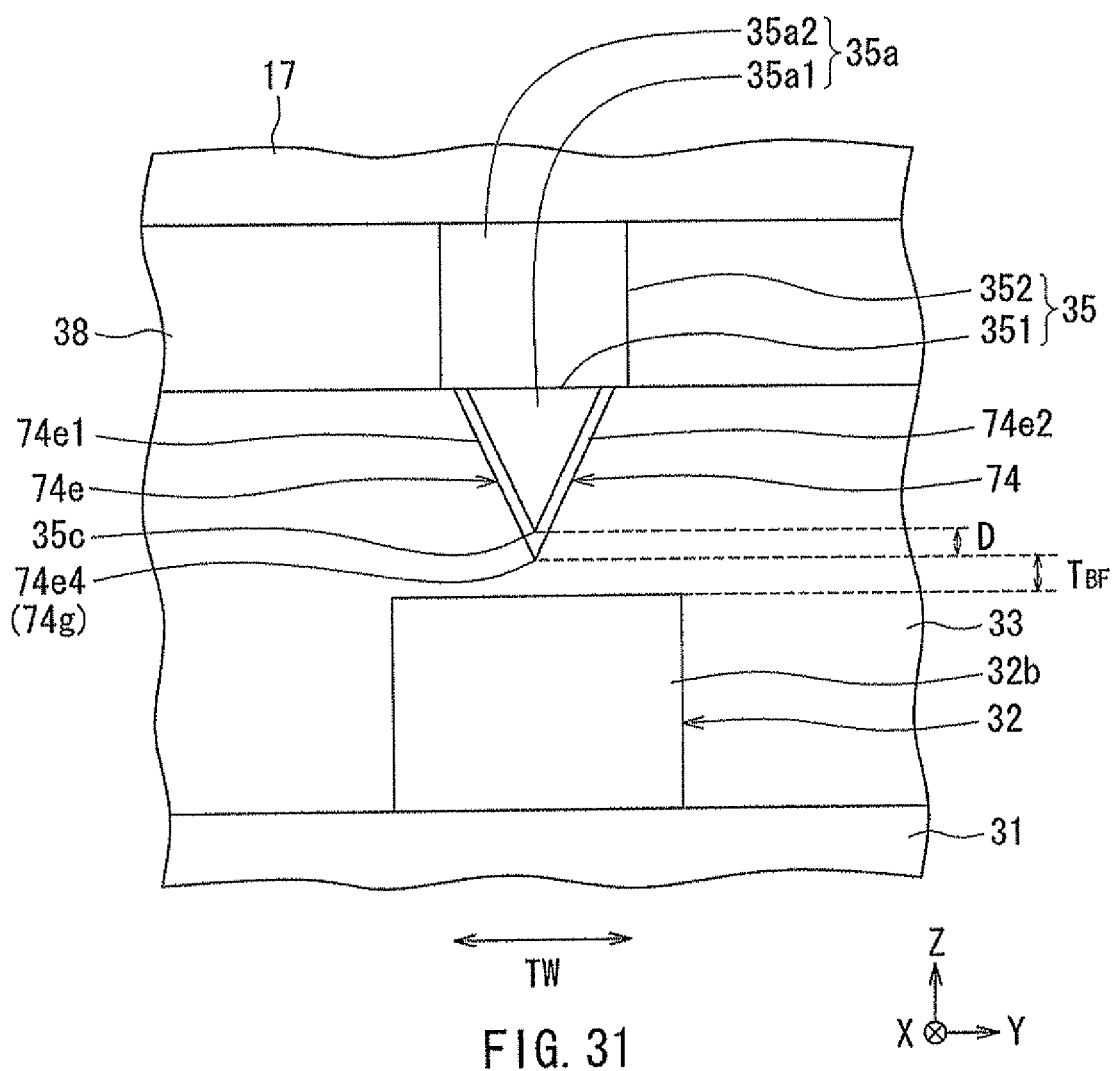
FIG. 31 is a front view showing a part of the medium facing surface of a head unit of the heat-assisted magnetic recording head according to the third embodiment of the invention.

A third embodiment of the present invention will now be described with reference to FIG. 29 to FIG. 31. FIG. 29 is a perspective view showing the core of the waveguide, the plasmon generator, and the magnetic pole of the heat-assisted magnetic recording head according to the present embodiment. FIG. 30 is a perspective view showing the plasmon generator of FIG. 29. FIG. 31 is a front view showing a part of the medium facing surface of the head unit of the heat-assisted magnetic recording head according to the present embodiment. The heat-assisted magnetic recording head according to the present embodiment has a plasmon generator 74 instead of the plasmon generator 34 of the first embodiment.

The plasmon generator 74 has a V-shaped portion 741. The V-shaped portion 741 extends in the direction perpendicular to the medium facing surface 12a (the X direction). The V-shaped portion 741 is V-shaped in cross section parallel to the medium facing surface 12a. In the example shown in FIG. 29 and FIG. 30, the entire plasmon generator 74 is composed of the V-shaped portion 741.

The outer surface of the plasmon generator 74 includes a plasmon exciting part 74a, a first inclined surface 74b, a second inclined surface 74c, and a front end face 74e. The plasmon exciting part 74a faces the evanescent light generating surface 32c with a predetermined distance therebetween. The first and second inclined surfaces 74b and 74c are each connected to the plasmon exciting part 74a. The first and second inclined surfaces 74b and 74c increase in distance from each other with increasing distance from the plasmon exciting part 74a. The first and second inclined surfaces 74b and 74c include surfaces of the V-shaped portion 741 that lie on opposite sides in the direction parallel to the medium facing surface 12a and the evanescent light generating surface 32c (the Y direction). The plasmon exciting part 74a includes a propagation edge 74a1 that is formed by the first and second inclined surfaces 74b and 74c meeting each other. In the example shown in FIG. 29 and FIG. 30, the entire plasmon exciting part 74a is composed of the propagation edge 74a1. In a cross section parallel to the medium facing surface 12a, the propagation edge 74a1 may have the shape of a perfectly pointed edge whereas it may have an arc shape in a microscopic view.

The V-shaped portion 741 includes a shape changing portion where the angle of inclination of each of the first and second inclined surfaces 74b and 74c with respect to the evanescent light generating surface 32c increases continuously with decreasing distance to the medium facing surface 12a. In the example shown in FIG. 29 and FIG. 30, the entire V-shaped portion 741 is composed of the shape changing portion. Specifically, in the example shown in FIG. 29 and FIG. 30, the entire plasmon generator 74 is the V-shaped portion 741 and is the shape changing portion.

The front end face 74e has a V-shape. The front end face 74e has two portions 74e1 and 74e2 that are connected to each other into a V-shape. The front end face 74e also includes a tip 74e4 that forms a near-field light generating part 74g. The tip 74e4 is formed by the outer sides of the two portions 74e1 and 74e2 meeting each other. The tip 74e4 may have the shape of a perfectly pointed edge whereas it may have an arc shape in a microscopic view.

The magnetic pole 35 of the present embodiment includes a first layer 351, and a second layer 352 lying on the first layer 351. The first layer 351 is accommodated in the V-shaped portion 741. The magnetic pole 35 has an end face 35a located in the medium facing surface 12a. The end face 35a includes an end face 35a1 of the first layer 351 located in the medium facing surface 12a and an end face 35a2 of the second layer 352 located in the medium facing surface 12a. The end face 35a1 lies between the two portions 74e1 and 74e2 of the front end face 74e of the plasmon generator 74 and has a triangular shape. The end face 35a1 has a tip 35c located at its bottom end. The second layer 352 has a bottom surface that is in contact with the top surface of the first layer 351 and the top end of the plasmon generator 74.

As shown in FIG. 31, the distance between the tip 74e4 of the front end face 74e of the plasmon generator 74 and the tip 35c of the end face 35a1 of the first layer 351 of the magnetic pole 35 will be denoted by the symbol D. D preferably falls within the range of 10 to 100 nm.

In the present embodiment, the front end face 74e of the plasmon generator 74 has the two portions 74e1 and 74e2 that are connected to each other into a V-shape. The end face 35a of the magnetic pole 35 located in the medium facing surface 12a includes the end face 35a1 of the first layer 351, which is a triangular portion lying between the two portions 74e1 and 74e2 of the front end face 74e. The end face 35a1 has the tip 35c located at its bottom end. Of the end face 35a of the magnetic pole 35, the tip 35c is closest to the bottom shield layer 29. Magnetic fluxes therefore concentrate at the vicinity of the tip 35c of the end face 35a of the magnetic pole 35, so that a high write magnetic field occurs from the vicinity of the tip 35c. Consequently, according to the present embodiment, the position of occurrence of a high write magnetic field in the end face 35a of the magnetic pole 35 can be brought closer to the near-field light generating part 74g of the plasmon generator 74 which generates near-field light.

The remainder of configuration, function and effects of the present embodiment are similar to those of the first embodiment.

Fourth Embodiment

Figure 32:
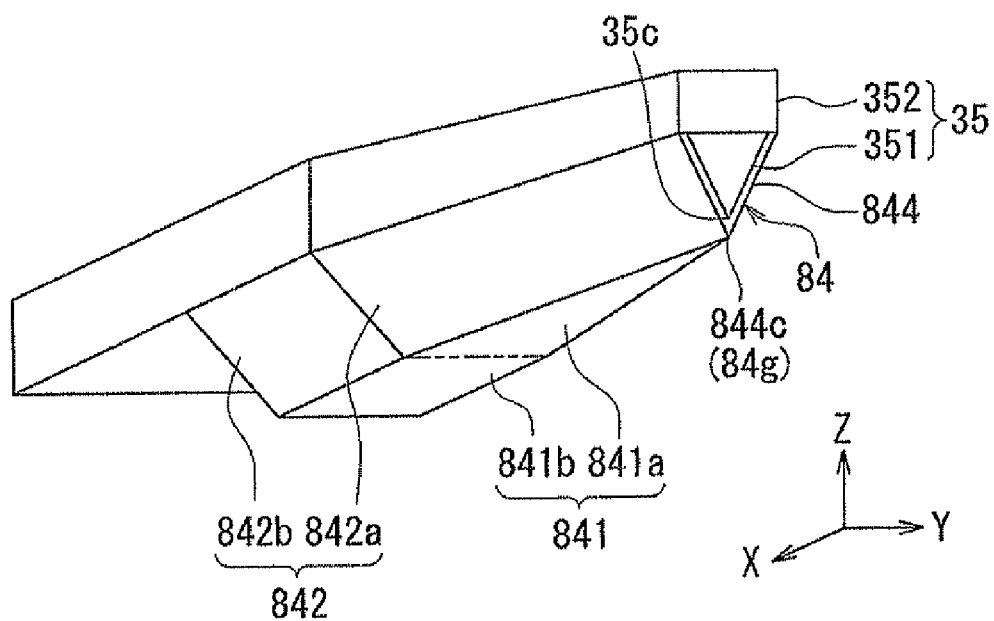
FIG. 32 is a perspective view showing a plasmon generator and a magnetic pole of a heat-assisted magnetic recording head according to a fourth embodiment of the invention.
Figure 33:
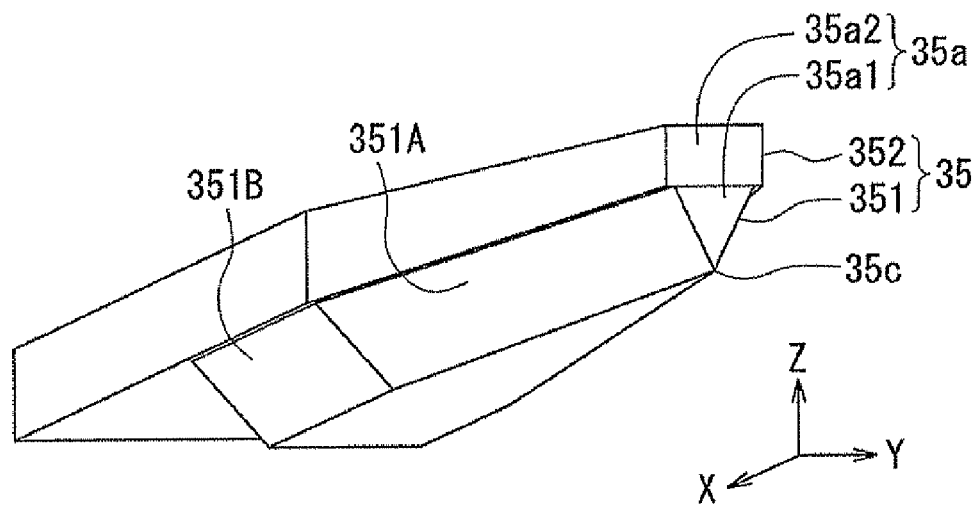
FIG. 33 is a perspective view showing the magnetic pole of FIG. 32.
Figure 34:
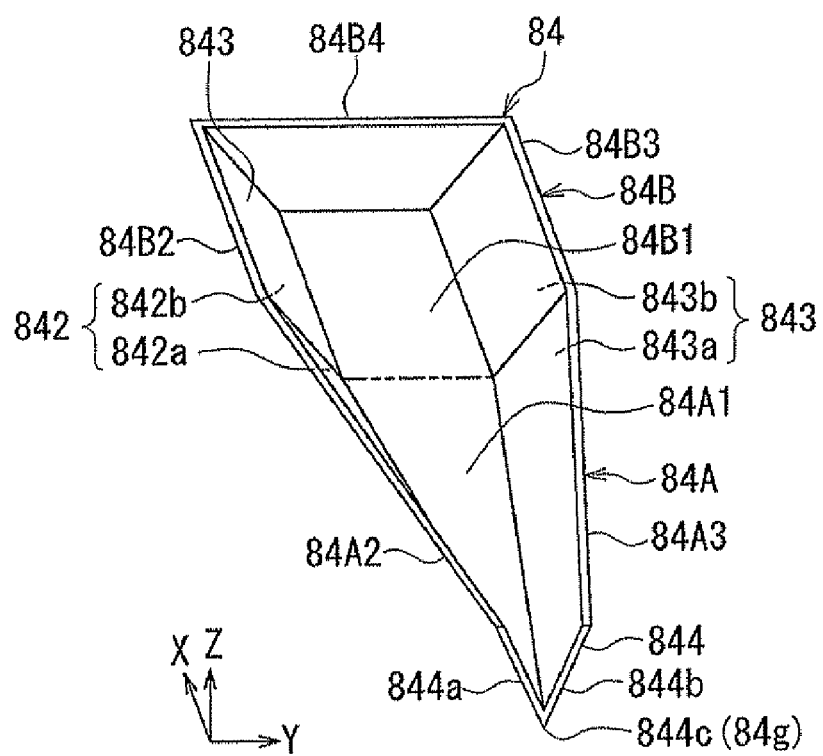
FIG. 34 is a perspective view showing the plasmon generator of FIG. 32.

A fourth embodiment of the present invention will now be described with reference to FIG. 32 to FIG. 34. FIG. 32 is a perspective view showing the plasmon generator and the magnetic pole of the heat-assisted magnetic recording head according to the present embodiment. FIG. 33 is a perspective view showing the magnetic pole of FIG. 32. FIG. 34 is a perspective view showing the plasmon generator of FIG. 32. The heat-assisted magnetic recording head according to the present embodiment has a plasmon generator 84 instead of the plasmon generator 34 of the first embodiment. In the present embodiment, as in the third embodiment, the magnetic pole 35 includes a first layer 351 and a second layer 352, the second layer 352 lying on the first layer 351.

As shown in FIG. 34, the plasmon generator 84 includes a first portion 84A that has an end face located in the medium facing surface 12a, and a second portion 84B that is located farther from the medium facing surface 12a than is the first portion 84A, such that the second portion 84B is continuous with the first portion 84A. In FIG. 34, the border between the first portion 84A and the second portion 84B is shown by a chain double-dashed line.

The first portion 84A has: a bottom part 84A1 that is shaped like a plate and faces the evanescent light generating surface 32c; and two sidewall parts 84A2 and 84A3 that are each shaped like a plate. The two sidewall parts 84A2 and 84A3 are located farther from the evanescent light generating surface 32c than is the bottom part 84A1, and are connected to opposite ends of the bottom part 84A1 in the direction parallel to the medium facing surface 12a and the evanescent light generating surface 32c (the Y direction).

The bottom part 84A1 has a width that decreases with decreasing distance to the medium facing surface 12a, the width being in the direction parallel to the medium facing surface 12a and the evanescent light generating surface 32c (the Y direction). The bottom part 84A1 has an end located in the medium facing surface 12a. At this end of the bottom part 84A1, the bottom part 84A1 has a zero width and the respective bottom ends of the sidewall parts 84A2 and 84A3 are in contact with each other.

The distance between the two sidewall parts 84A2 and 84A3 in the direction parallel to the medium facing surface 12a and the evanescent light generating surface 32c (the Y direction) increases with increasing distance from the evanescent light generating surface 32c, and decreases with decreasing distance to the medium facing surface 12a.

The second portion 84B has: a bottom part 84B1 that is continuous with the bottom part 84A1 of the first portion 84A; a sidewall part 84B2 that is continuous with the sidewall part 84A2 of the first portion 84A; a sidewall part 84B3 that is continuous with the sidewall part 84A3 of the first portion 84A; and a wall part 84B4 that connects respective ends of the bottom part 84B1 and the sidewall parts 84B2 and 84B3 to each other, the ends being farther from the medium facing surface 12a. The bottom part 84B1 has a constant width in the direction parallel to the medium facing surface 12a and the evanescent light generating surface 32c (the Y direction) regardless of the distance from the medium facing surface 12a. Note that the second portion 8413 need not necessarily have the wall part 84B4.

The distance between the two sidewall parts 84B2 and 84B3 in the direction parallel to the medium facing surface 12a and the evanescent light generating surface 32c (the Y direction) increases with increasing distance from the evanescent light generating surface 32c, but does not change according to the distance from the medium facing surface 12a.

As shown in FIG. 34, the first portion 84A and the second portion 84B of the plasmon generator 84 form inside a space for accommodating the first layer 351 of the magnetic pole 35. Note that the plasmon generator 84 need not necessarily have the second portion 8413.

The plasmon generator 84 has an outer surface including a plurality of portions described below, and has a near-field light generating part 84g located in the medium facing surface 12a. As shown in FIG. 32, the outer surface of the plasmon generator 84 includes a plasmon exciting part 841 which is a flat surface part that faces the evanescent light generating surface 32c of the core 32 with a predetermined distance therebetween. The plasmon exciting part 841 includes a width changing portion 841a formed by the bottom surface of the bottom part 84A1 of the first portion 84A, and a constant width portion 841b formed by the bottom surface of the bottom part 84131 of the second portion 84B. In FIG. 32, the border between the width changing portion 841a and the constant width portion 841b is shown by a chain double-dashed line.

The width changing portion 841a has a width that decreases with decreasing distance to the medium facing surface 12a, the width being in the direction parallel to the medium facing surface 12a and the evanescent light generating surface 32c (the Y direction). The width changing portion 841a has two sides that are opposite in the direction of the width (the Y direction). The angle that one of the two sides forms with respect to the direction perpendicular to the medium facing surface 12a (the X direction) is equal to the angle that the other of the two sides forms with respect to the direction perpendicular to the medium facing surface 12a (the X direction). This angle falls within the range of 3 to 50 degrees, and preferably within the range of 10 to 25 degrees.

The constant width portion 841b is located farther from the medium facing surface 12a than is the width changing portion 841a, such that the constant width portion 841b is continuous with the width changing portion 841a. The constant width portion 841b has a constant width in the direction parallel to the medium facing surface 12a and the evanescent light generating surface 32c (the Y direction) regardless of the distance from the medium facing surface 12a.

The part of the clad layer 33 that is interposed between the evanescent light generating surface 32c and the plasmon exciting part 841 forms a buffer part 33A having a refractive index lower than that of the core 32.

The outer surface of the plasmon generator 84 further includes a first inclined surface 842 and a second inclined surface 843 that are each connected to the plasmon exciting part 841. The first and second inclined surfaces 842 and 843 increase in distance from each other with increasing distance from the plasmon exciting part 841. The plasmon exciting part 841 connects respective ends of the inclined, surfaces 842 and 843 to each other, the ends being closer to the evanescent light generating surface 32c. The first inclined surface 842 includes an inclined surface 842a that is included in the first portion 84A and an inclined surface 842b that is included in the second portion 84B. The second inclined surface 843 includes an inclined surface 843a that is included in the first portion 84A and an inclined surface 843b that is included in the second portion 84B.

The inclined surfaces 842a and 843a are formed by the respective surfaces of the two sidewall parts 84A2 and 84A3 of the first portion 84A that lie on opposite sides in the direction parallel to the medium facing surface 12a and the evanescent light generating surface 32c (the Y direction). The inclined surfaces 842b and 843b are formed by the respective surfaces of the two sidewall parts 84B2 and 84B3 of the second portion 84B that lie on opposite sides in the direction parallel to the medium facing surface 12a and the evanescent light generating surface 32c (the Y direction).

The angle of inclination of each of the inclined surfaces 842a and 843a included in the first portion 84A with respect to the evanescent light generating surface 32c increases continuously with decreasing distance from the medium facing surface 12a. In the present embodiment, the first portion 84A of the plasmon generator 84 therefore corresponds to the shape changing portion of the present invention. Each of the inclined surfaces 842b and 843b included in the third portion 84B forms a constant angle of inclination with respect to the evanescent light generating surface 32c regardless of the distance from the medium facing surface 12a.

The outer surface of the plasmon generator 84 further includes a front end face 844 located in the medium facing surface 12a. The front end face 844 is formed by the end face of the first portion 84A. The front end face 844 has two portions 844a and 844b that are connected to each other into a V-shape, and a tip 844c that is located at the bottom end of the front end face 844. The tip 844c forms the near-field light generating part 84g. The tip 844c may have the shape of a perfectly pointed edge whereas it may have an arc shape in a microscopic view. The portion 844a is the end face of the sidewall part 84A2 located in the medium facing surface 12a. The portion 844b is the end face of the sidewall part 84A3 located in the medium facing surface 12a.

As shown in FIG. 33, the magnetic pole 35 has an end face 35a located in the medium facing surface 12a. The end face 35a includes an end face 35a1 of the first layer 351 located in the medium facing surface 12a and an end face 35a2 of the second layer 352 located in the medium facing surface 12a.

The first layer 351 of the magnetic pole 35 is accommodated in the space formed by the first portion 84A and the second portion 84B of the plasmon generator 84. The first layer 351 includes a first portion 351A and a second portion 351B. The first portion 351A is accommodated in the space formed by the first portion 84A (the bottom part 84A1 and the sidewall parts 84A2 and 84A3). The second portion 3513 is accommodated in the space formed by the second portion 84B (the bottom part 84B1 and the sidewall parts 84B2 and 84B3).

The first portion 351A lies between the two sidewall parts 84A2 and 84A3 of the first portion 84A of the plasmon generator 84, and is in contact with the bottom part 84A1 and the two sidewall parts 84A2 and 84A3. The width of the first portion 351A in the direction parallel to the medium facing surface 12a and the evanescent light generating surface 32c (the Y direction) increases with increasing distance from the evanescent light generating surface 32c, and decreases with decreasing distance to the medium facing surface 12a. The end face of the first portion 351A located in the medium facing surface 12a, i.e., the end face 35a1 of the first layer 351 located in the medium facing surface 12a, lies between the two portions 844a and 844b of the front end face 844 of the plasmon generator 84, and has a triangular shape. The end face 35a1 has a tip 35c located at its bottom end.

The second portion 351B lies between the two sidewall parts 84B2 and 84133 of the second portion 84B of the plasmon generator 84, and is in contact with the bottom part 84B1 and the two sidewall parts 84B2 and 84B3. The width of the second portion 351B in the direction parallel to the medium facing surface 12a and the evanescent light generating surface 32c (the Y direction) increases with increasing distance from the evanescent light generating surface 32c, but does not change according to the distance from the medium facing surface 12a.

The second layer 352 of the magnetic pole 35 has a bottom surface that is in contact with the top surface of the first layer 351 and the top end of the plasmon generator 84.

The length of the plasmon generator 84 in the X direction falls within the range of 0.6 to 4.0 μm, for example. The length of the first portion 84A in the X direction falls within the range of 200 to 2000 nm, for example. The length of the second portion 84B in the X direction falls within the range of 0 to 2000 nm, for example.

As in the third embodiment, the distance between the tip 844c of the front end face 844 of the plasmon generator 84 and the tip 35c of the end face 35a1 of the first layer 351 of the magnetic pole 35 preferably falls within the range of 10 to 100 nm.

In the present embodiment, surface plasmons are excited on the plasmon exciting part 841, which is a flat surface part that faces the evanescent light generating surface 32c of the core 32 with a predetermined distance therebetween, through coupling with evanescent light that occurs from the evanescent light generating surface 32c. This makes it possible to excite more surface plasmons.

The plasmon exciting part 841 includes the width changing portion 841a. The width of the width changing portion 841a in the direction parallel to the medium facing surface 12a and the evanescent light generating surface 32c (the Y direction) decreases with decreasing distance to the medium facing surface 12a. The surface plasmons excited on the width changing portion 841a are gradually transformed into edge plasmons, which are surface plasmons to propagate along the two sides of the width changing portion 841a that are opposite in the direction of the width (the Y direction), while propagating over the width changing portion 841a. The surface plasmons (including edge plasmons) propagating over the width changing portion 841a are propagated to the near-field light generating part 84g. Consequently, the surface plasmons concentrate at the near-field light generating part 84g, and near-field light occurs from the near-field light generating part 84g based on the surface plasmons.

According to the present embodiment, the electric field intensity of the surface plasmons is enhanced in the width changing portion 841a based on the same principles as in the case of the enhancement of the electric field intensity of the surface plasmons in the flat surface part 141b (the width changing portion) in the first modification example of the first embodiment.

According to the present embodiment, the plasmon exciting part 841 also includes the constant width portion 841b. This makes it possible to reduce the width $W_{wg}$ of the core 32 in the vicinity of the plasmon generator 84 as in the second modification example of the first embodiment. Consequently, at least a part of the core 32 in the vicinity of the plasmon generator 84 can be brought into a single mode, whereby the use efficiency of the laser light that propagates through the core 32 can be improved.

According to the present embodiment, as in the third embodiment, the position of occurrence of a high write magnetic field in the end face 35a of the magnetic pole 35 can be brought closer to the near-field light generating part 84g of the plasmon generator 84 which generates near-field light.

In the present embodiment, the first portion 84A of the plasmon generator 84 has the bottom part 84A1 that is shaped like a plate and faces the evanescent light generating surface 32c, and has the two sidewall parts 84A2 and 84A3 that are each shaped like a plate. The width of the bottom part 84A1 in the direction parallel to the medium facing surface 12a and the evanescent light generating surface 32c (the Y direction) decreases with decreasing distance to the medium facing surface 12a. The distance between the two sidewall parts 84A2 and 84A3 in the direction parallel to the medium facing surface 12a and the evanescent light generating surface 32c (the Y direction) increases with increasing distance from the evanescent light generating surface 32c, and decreases with decreasing distance to the medium facing surface 12a. The magnetic pole 35 includes the first portion 351A that lies between the two sidewall parts 84A2 and 84A3 and is in contact with the bottom part 84A1 and the two sidewall parts 84A2 and 84A3. The width of the first portion 351A in the direction parallel to the medium facing surface 12a and the evanescent light generating surface 32c (the Y direction) decreases with decreasing distance to the medium facing surface 12a. Consequently, according to the present embodiment, magnetic fluxes passing through the magnetic pole 35 can be concentrated as they approach the end face 35a1 of the first layer 351 of the magnetic pole 35. This makes it possible to produce a high write magnetic field from the end face 35a1.

The remainder of configuration, function and effects of the present embodiment are similar to those of the third embodiment.

The present invention is not limited to the foregoing embodiments, and various modifications may be made thereto. For example, the V-shaped portion 741 of the plasmon generator 74 of the third embodiment may include a portion located between the medium facing surface 12a and the end of the shape changing portion closer to the medium facing surface 12a. In this portion, the angle of inclination of each of the inclined surfaces 74b and 74c with respect to the evanescent light generating surface 32c may be equal to that at the foregoing end of the shape changing portion. Similarly, the plasmon generator 84 of the fourth embodiment may include a portion located between the medium facing surface 12a and the end of the first portion 84A closer to the medium facing surface 12a. In this portion, the angle of inclination of each of the inclined surfaces 842 and 843 with respect to the evanescent light generating surface 32c may be equal to that at the foregoing end of the first portion 84A. According to such modification examples, it is possible, as in the second embodiment, to prevent the near-field light generated by the plasmon generator 74 or 84 from varying in characteristic due to variations in the position of the medium facing surface 12a.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A heat-assisted magnetic recording head comprising:
    a medium facing surface that faces a magnetic recording medium;
    a magnetic pole that has an end face located in the medium facing surface and produces a write magnetic field for writing data on the magnetic recording medium;
    a waveguide including a core and a clad, the core propagating light; and
    a plasmon generator, wherein:
    the core has an evanescent light generating surface that generates evanescent light based on the light propagated through the core;
    the plasmon generator has an outer surface including a plasmon exciting part, and has a near-field light generating part located in the medium facing surface, the plasmon exciting part facing the evanescent light generating surface with a predetermined distance therebetween;
    a surface plasmon is excited on the plasmon exciting part through coupling with the evanescent light generated from the evanescent light generating surface;
    the near-field light generating part generates near-field light based on the surface plasmon excited on the plasmon exciting part;
    the outer surface of the plasmon generator further includes first and second inclined surfaces that are each connected to the plasmon exciting part, the first and second inclined surfaces increasing in distance from each other with increasing distance from the plasmon exciting part;
    the plasmon generator includes a shape changing portion where an angle of inclination of each of the first and second inclined surfaces with respect to the evanescent light generating surface increases continuously with decreasing distance to the medium facing surface.

2. The heat-assisted magnetic recording head according to claim 1, wherein each of the first and second inclined surfaces has an end located in the medium facing surface, and the angle of inclination peaks at the medium facing surface.

3. The heat-assisted magnetic recording head according to claim 2, wherein the shape changing portion has an end located in the medium facing surface.

4. The heat-assisted magnetic recording head according to claim 2, wherein:
    the shape changing portion has an end that is closer to the medium facing surface, the end being located at a distance from the medium facing surface; and
    the plasmon generator further includes a portion located between the end of the shape changing portion and the medium facing surface, and the angle of inclination in this portion is equal to that at the end of the shape changing portion.

5. The heat-assisted magnetic recording head according to claim 1, wherein:

the plasmon exciting part includes a propagation edge that is formed by the first and second inclined surfaces meeting each other;

the near-field light generating part lies at an end of the propagation edge; and at least a part of the propagation edge lies in the shape changing portion.

6. The heat-assisted magnetic recording head according to claim 1, wherein:

the plasmon exciting part includes a flat surface part that connects respective ends of the first and second inclined surfaces to each other, the respective ends being closer to the evanescent light generating surface;

the flat surface part includes a width changing portion, the width changing portion having a width that decreases with decreasing distance to the medium facing surface, the width being in a direction parallel to the medium facing surface and the evanescent light generating surface; and at least a part of the width changing portion lies in the shape changing portion.

7. The heat-assisted magnetic recording head according to claim 6, wherein:

the width changing portion has a front end part that is closer to the medium facing surface, the front end part being located at a distance from the medium facing surface; and the plasmon exciting part further has a propagation edge that connects the front end part of the width changing portion to the near-field light generating part.

8. The heat-assisted magnetic recording head according to claim 7, wherein at least a part of the propagation edge lies in the shape changing portion.

9. The heat-assisted magnetic recording head according to claim 1, wherein the outer surface of the plasmon generator further includes a front end face located in the medium facing surface, the front end face including a tip that forms the near-field light generating part.

10. The heat-assisted magnetic recording head according to claim 9, wherein the front end face of the outer surface of the plasmon generator has two portions that are connected to each other into a V-shape, and the end face of the magnetic pole has a triangular portion that lies between the two portions of the front end face.

11. The heat-assisted magnetic recording head according to claim 1, wherein:

the plasmon generator has a V-shaped portion that includes the shape changing portion, the V-shaped portion being V-shaped in cross section parallel to the medium facing surface;

the first and second inclined surfaces include surfaces of the V-shaped portion that lie on opposite sides in a direction parallel to the medium facing surface and the evanescent light generating surface;

the plasmon exciting part includes a propagation edge that is formed by the first and second inclined surfaces meeting each other; and the magnetic pole includes a portion accommodated in the V-shaped portion.

12. The heat-assisted magnetic recording head according to claim 1, wherein:

the plasmon generator has a bottom part that is shaped like a plate and faces the evanescent light generating surface, and two sidewall parts that are each shaped like a plate and are located farther from the evanescent light generating surface than is the bottom part, the two sidewall parts being connected to opposite ends of the bottom part in a direction parallel to the medium facing surface and the evanescent light generating surface;

the bottom part has a width that decreases with decreasing distance to the medium facing surface, the width being in the direction parallel to the medium facing surface and the evanescent light generating surface;

a distance between the two sidewall parts in the direction parallel to the medium facing surface and the evanescent light generating surface increases with increasing distance from the evanescent light generating surface, and decreases with decreasing distance to the medium facing surface;

the plasmon exciting part includes a bottom surface of the bottom part;

the first and second inclined surfaces include respective surfaces of the two sidewall parts, the respective surfaces lying on opposite sides in the direction parallel to the medium facing surface and the evanescent light generating surface; and the magnetic pole includes a portion that is accommodated in a space formed by the bottom part and the two sidewall parts so as to be in contact with the bottom part and the two sidewall parts.

13. The heat-assisted magnetic recording head according to claim 1, wherein $\theta_A$ and $\theta_B$ satisfy a condition that $\cos \theta_A / \cos \theta_B$ has a value in the range of 0.2 to 0.9 inclusive and $\theta_B$ is greater than or equal to 20 degrees, where $\theta_A$ is the angle of inclination at an end of the shape changing portion closest to the medium facing surface, and $\theta_B$ is the angle of inclination at an end of the shape changing portion farthest from the medium facing surface.

14. The heat-assisted magnetic recording head according to claim 1, further comprising a buffer part that is located between the evanescent light generating surface and the plasmon exciting part and has a refractive index lower than that of the core.

15. A head gimbal assembly comprising: the heat-assisted magnetic recording head according to claim 1; and a suspension that supports the heat-assisted magnetic recording head.

16. A magnetic recording device comprising: a magnetic recording medium; the heat-assisted magnetic recording head according to claim 1; and a positioning device that supports the heat-assisted magnetic recording head and positions the heat-assisted magnetic recording head with respect to the magnetic recording medium.

* * * * *